US011618453B2

(12) United States Patent
Jia et al.

(10) Patent No.: US 11,618,453 B2
(45) Date of Patent: Apr. 4, 2023

(54) GRID-BASED ROAD MODEL WITH MULTIPLE LAYERS

(71) Applicant: Aptiv Technologies Limited, St. Michael (BB)

(72) Inventors: Bin Jia, Columbia, MD (US); Sana Sarfraz, Woodland Hills, CA (US); David A. Schwartz, Moorpark, CA (US); Kumar Vishwajeet, Pasadena, CA (US)

(73) Assignee: Aptiv Technologies Limited, St. Michael (BB)

( * ) Notice: Subject to any disclaimer, the term of this patent is extended or adjusted under 35 U.S.C. 154(b) by 258 days.

(21) Appl. No.: 17/183,254

(22) Filed: Feb. 23, 2021

(65) Prior Publication Data

US 2022/0274601 A1  Sep. 1, 2022

(51) Int. Cl.
*G06V 10/44* (2022.01)
*B60W 40/072* (2012.01)
(Continued)

(52) U.S. Cl.
CPC .......... *B60W 40/072* (2013.01); *B60W 30/12* (2013.01); *B60W 30/14* (2013.01); *B60W 60/001* (2020.02); *G06K 9/6288* (2013.01); *G06T 11/00* (2013.01); *G06V 10/44* (2022.01); *G06V 20/588* (2022.01); *B60W 2420/42* (2013.01); *B60W 2420/52* (2013.01);
(Continued)

(58) Field of Classification Search
CPC .... B60W 40/072; B60W 30/12; B60W 30/14; B60W 60/001; B60W 2420/42; B60W 2420/52; B60W 2510/20; B60W 2520/14; B60W 2552/53; G06K 9/6288; G06T 11/00; G06V 10/44; G06V 20/588; G06V 10/814; G01C 21/32; G01C 21/3453; G01S 5/18; G01S 5/02521; G01S 5/0252; G01S 5/02522; G01S 5/02524; G01S 5/02525; G07C 5/02; G07C 5/08
See application file for complete search history.

(56) References Cited

U.S. PATENT DOCUMENTS

2019/0049580 A1\* 2/2019 Natroshvili ........... G01S 7/4808
2020/0183011 A1\* 6/2020 Lin ..................... G01C 21/3881
(Continued)

OTHER PUBLICATIONS

"Extended European Search Report", EP Application No. 22150641.3, dated Jun. 20, 2022, 10 pages.
(Continued)

*Primary Examiner* — Kenneth J Malkowski
(74) *Attorney, Agent, or Firm* — Sawtooth Patent Group PLLC

(57) ABSTRACT

This document describes techniques, apparatuses, and systems for a grid-based road model with multiple layers. An example road-perception system generates a roadway grid representation that includes multiple cells. The road-perception system uses data from multiple information sources to generate a road model that includes multiple layers. Each layer represents a roadway attribute of each cell in the grid and includes one or more layer hypotheses. In this way, the described techniques and systems can provide an accurate and reliable road model and quantify uncertainty therein.

20 Claims, 7 Drawing Sheets

(51) Int. Cl.
- B60W 60/00 (2020.01)
- G06V 20/56 (2022.01)
- B60W 30/12 (2020.01)
- B60W 30/14 (2006.01)
- G06K 9/62 (2022.01)
- G06T 11/00 (2006.01)

(52) U.S. Cl.
CPC ..... *B60W 2510/20* (2013.01); *B60W 2520/14* (2013.01); *B60W 2552/53* (2020.02)

(56) References Cited

U.S. PATENT DOCUMENTS

| | | | | |
|---|---|---|---|---|
| 2020/0378766 | A1* | 12/2020 | Omari | G01S 5/18 |
| 2021/0400432 | A1* | 12/2021 | Ivanov | H04W 4/024 |
| 2022/0198198 | A1* | 6/2022 | Marcotte | G06V 20/588 |

OTHER PUBLICATIONS

Kurdej, et al., "Controlling Remanence in Evidential Grids Using Geodata for Dynamic Scene Perception", Jun. 7, 2013, 34 pages.

Kurdej, et al., "Map-Aided Evidential Grids for Driving Scene Understanding", Apr. 2015, pp. 30-41.

Schreier, et al., "A High-Level Road Model Information Fusion Framework and its Application to Multi-Lane Speed Limit Inference", Jun. 11, 2017, pp. 1201-1208.

"Curvature of a 1D curve in a 2D or 3D space—MathWorks", Retrieved at: https://www.mathworks.com/matlabcentral/fileexchange/69452-curvature-of-a-1d-curve-in-a-2d-or-3d-space—on Nov. 10, 2020, 4 pages.

"Dempster-Shafer theory—Wikipedia", Retrieved at: https://en.wikipedia.org/wiki/Dempster-Shafer_theory—on Mar. 24, 2020, 12 pages.

"Menger curvature—Wikipedia", Retrieved at: https://en.wikipedia.org/wiki/Menger_curvature—on Nov. 10, 2020, Nov. 9, 2020, 3 pages.

"United State Pavement Markings", Retrieved at: https://mutcd.fhwa.dot.gov/services/publications/fhwaop02090/uspavementmarkings.pdf—on Nov. 10, 2020, 9 pages.

"United States Road Symbol Signs", Retrieved at: https://mutcd.fhwa.dot.gov/services/publications/fhwaop02084/us_road_symbol_signs.pdf—on Nov. 10, 2020, 9 pages.

Dierkes, et al., "Corridor Selection Under Semantic Uncertainty for Autonomous Road Vehicles", Nov. 2018, pp. 505-512.

Dierkes, et al., "Towards a Multi-Hypothesis Road Representation for Automated Driving", Sep. 2015, 8 pages.

Ganji, et al., "Road Safety Evaluation using a Novel Cross Efficiency Method based on Double Frontiers DEA and Evidential Reasoning Approach", Dec. 2017, 16 pages.

Huang, "Lane Estimation for Autonomous Vehicles using Vision and LIDAR", PhD Thesis, MIT, Feb. 2010, 114 pages.

Mehrannia, et al., "A Dempster-Shafer Sensor Fusion Approach for Traffic Incident Detection and Localization", 21st International Conference on Intelligent Transportation Systems (ITSC), Nov. 2018, pp. 3911-3916.

Moujtahid, et al., "Evidential Multisensor Fusion and Erroneous Management of Lanes for Autonomous Driving", 2019 IEEE Sensors Applications Symposium (SAS), Mar. 2019, 6 pages.

Nassreddine, et al., "Map matching algorithm using interval analysis and Dempster-Shafer theory", Jul. 2009, 6 pages.

Qin, et al., "Detecting Anomalous Trajectories Using the Dempster-Shafer Evidence Theory Considering Trajectory Features from Taxi GNSS Data", Oct. 2018, 25 pages.

Sahir, "Canny Edge Detection Step by Step in Python—Computer Vision", Jan. 25, 2019, 18 pages.

Steyer, et al., "Grid-Based Environment Estimation Using Evidential Mapping and Particle Tracking", Jun. 2018, 13 pages.

Szucs, "Route planning with uncertain information using Dempster-Shafer theory", International Conference on Management and Service Science, Oct. 2009, 4 pages.

Thomas, et al., "Grid-based Online Road Model Estimation for Advanced Driver Assistance Systems", Jun. 2015, pp. 71-76.

Thomas, et al., "Semantic Grid-Based Road Model Estimation for Autonomous Driving", Jun. 2019, 8 pages.

Thomas, et al., "Sensor-based road model estimation for autonomous driving", Jun. 2017, pp. 1764-1769.

Topfer, et al., "Efficient Road Scene Understanding for Intelligent Vehicles Using Compositional Hierarchical Models", May 2015, 10 pages.

Uzer, et al., "Dempster Shafer Grid-based Hybrid Fusion of Virtual Lanes for Autonomous Driving", Nov. 2019, pp. 3760-3765.

\* cited by examiner

US 11,618,453 B2

GRID-BASED ROAD MODEL WITH MULTIPLE LAYERS

BACKGROUND

To control a vehicle, road-perception systems can provide vehicle-based systems with information about road conditions, road geometry, and lane geometry. A variety of vehicle-based systems that rely on these road-perception systems exist, including as examples, Automatic Cruise Control (ACC), Traffic-Jam Assist (TJA), Lane-Centering Assist (LCA), and L3/L4 Autonomous Driving on Highways (L3/L4). Some safety regulations require such vehicle-based systems, including L3/L4 systems, to generate road models that can conceptualize or model multiple attributes of a roadway. In addition, some safety standards require road models to quantify an uncertainty associated with the road model. Existing road-perception systems generally do not provide information about multiple roadway attributes, if any. These road-perception systems also tend to rely on parametric methods (e.g., representing lane boundaries and lane centers as polylines) that are often inaccurate, which makes them unreliable for use in road modeling; furthermore, their uncertainty cannot be quantified. In addition, even if sensor data is obtained from multiple different sensors, some road-perception systems still cannot accurately fuse the sensor data to build the road model, especially if the sensor data from two sensors conflicts.

SUMMARY

This document describes techniques, apparatuses, and systems for a grid-based road model with multiple layers. For example, this document describes a road-perception system configured to generate, for a roadway, a grid representation that includes multiple cells. The road-perception system uses data from multiple information sources to generate a road model for the roadway. There are multiple layers underlying the road model. Each layer represents a roadway attribute of each cell in the grid. The road model also includes layer hypotheses that indicate a potential attribute state for the cells in each layer.

The road-perception system then determines mass values associated with the layer hypotheses. The mass values indicate confidence associated with the data contributing to the respective layer hypotheses. The road-perception system uses the mass values to determine belief parameters and plausibility parameters associated with the layer hypotheses. The belief parameter indicates confidence in the potential attribute state for that cell, and the plausibility parameter indicates a likelihood in the potential attribute state being accurate for that cell. The road-perception system determines whether the belief parameters and the plausibility parameters associated with the layer hypotheses satisfy a respective threshold value. Depending on whether the belief parameters and plausibility parameters of at least one layer hypothesis satisfies the respective threshold value, an autonomous-driving system or an assisted-driving system can either use or not use the at least one layer hypothesis as an input to operate the vehicle on the roadway.

This document also describes other operations of the above-summarized systems, techniques, and apparatuses and other methods set forth herein, as well as means for performing these methods.

This Summary introduces simplified concepts for a grid-based road model with multiple layers, which are further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of a grid-based road model with multiple layers are described in this document with reference to the following figures. The same numbers are used throughout the drawings to reference like features and components.

DETAILED DESCRIPTION

Overview

Road-perception systems can be an important technology for assisted-driving and autonomous-driving systems. Some vehicle-based systems (e.g., L3/L4 systems) and some safety standards (e.g., Safety of the Intended Functionality (SOTIF) of a system (ISO/PAS 21448:2019 "Road vehicles—Safety of the intended functionality")) may require a road-perception system not only to model a roadway but also to quantify uncertainty in the model and maintain one or more hypotheses.

Road models may be necessary for many features of vehicle-based systems, including ACC, LCA, and L3/L4 systems. For example, road modeling is critical for these systems to understand the roadway environment, to plan driving trajectories, and to control the vehicle. Some road-perception systems define a roadway as any street, avenue, road or roadway, expressway, highway, driveway, ramp, alley, parking lot, garage, trail, or other path that can be traversed by the vehicle. These systems generally define the roadway as a set of parametric lanes (e.g., represented by a set of polyline boundaries). As a result, the curvature of the roadway is often not considered. These systems also generally provide an incomplete road model with only a single layer or frame of discernment (FOD) and cannot fuse data from different sources.

In contrast, this document describes road-perception techniques to accurately model the roadway and elements thereof as a grid of cells. This grid approach allows the described road-perception techniques to avoid inaccurate lane assumptions associated with parametric representations of lane boundaries. Roadway elements are represented as one or more layer hypothesis for each cell. The described road-perception techniques fuse information regarding the roadway from multiple sources (e.g., camera systems, Lidar systems, maps, radar systems, ultrasonics) to develop a static grid with multiple layers. The multiple layers represent different roadway attributes (e.g., cell category, lane-marker type, lane-marker color, lane-number assignment, pavement-marking type, road-sign type). The road-perception techniques can also extract mass values from the information sources to estimate belief and plausibility parameters associated with each layer hypothesis. In this way, the described road-perception techniques can provide critical information about the roadway environment and the model uncertainty to provide safe path planning and maneuver control for vehicle-based systems.

This section describes just one example of how the described techniques and systems can generate a grid-based road model with multiple layers. This document describes other examples and implementations.

Operating Environment

Figure 1:
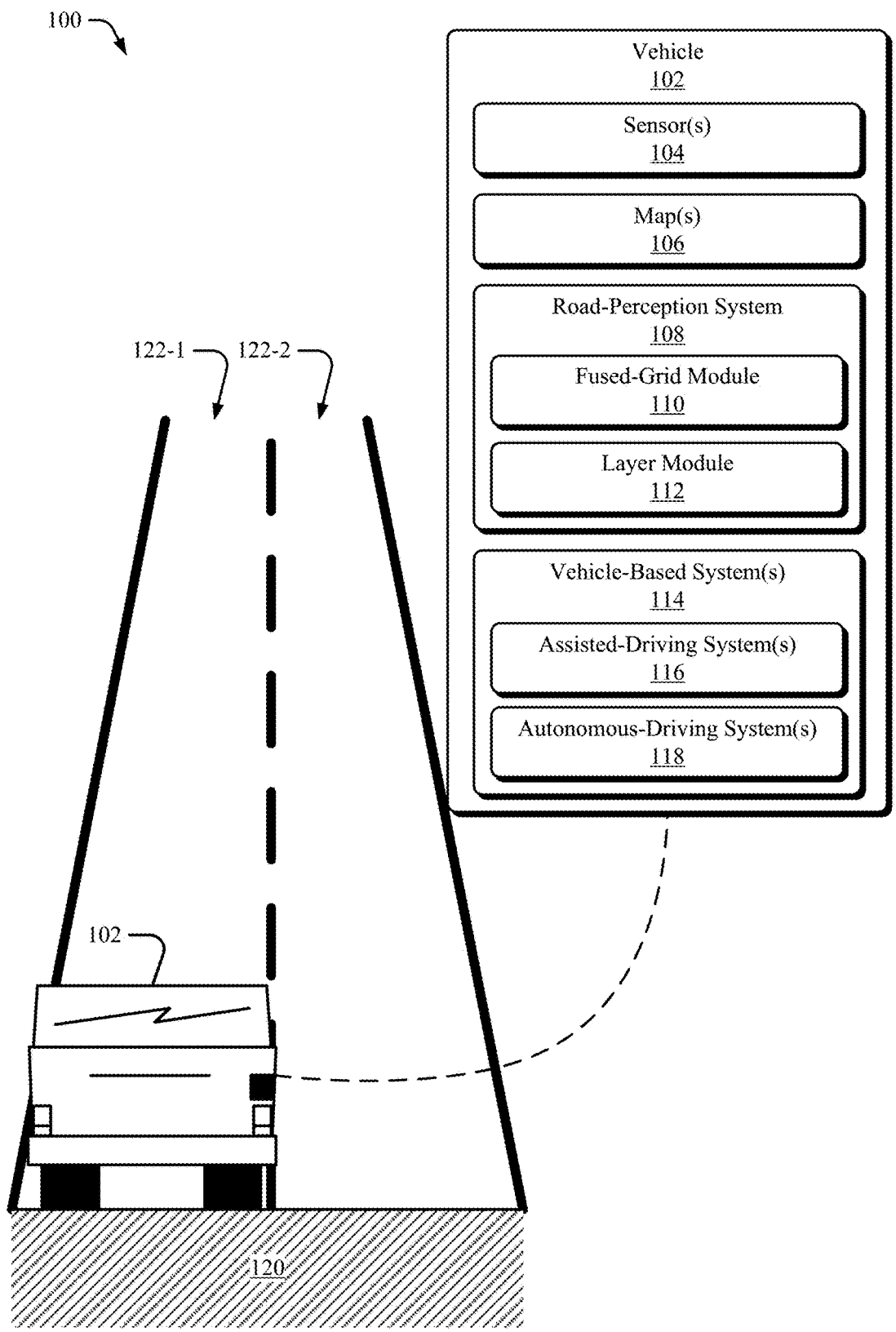
FIG. 1 illustrates an example environment in which a road-perception system generates a grid-based road model with multiple layers.

FIG. 1 illustrates an example environment 100 in which a road-perception system 108 generates a grid-based road model with multiple layers. In the depicted environment 100, the road-perception system 108 is mounted to, or integrated within, a vehicle 102. The vehicle 102 can travel on a roadway 120, which includes lanes 122 (e.g., a first lane 122-1 and a second lane 122-2). In this implementation, the vehicle 102 is traveling in the first lane 122-1.

Although illustrated as a car, the vehicle 102 can represent other motorized vehicles (e.g., a motorcycle, a bus, a tractor, a semi-trailer truck, or construction equipment). In general, manufacturers can mount the road-perception system 108 to any moving platform that can travel on the roadway 120.

In the depicted implementation, a portion of the road-perception system 108 is mounted into a rear-view mirror of the vehicle 102 to have a field-of-view of the roadway 120. The road-perception system 108 can project the field-of-view from any exterior surface of the vehicle 102. For example, vehicle manufacturers can integrate at least a part of the road-perception system 108 into a side mirror, bumper, roof, or any other interior or exterior location where the field-of-view includes the roadway 120. In general, vehicle manufacturers can design the location of the road-perception system 108 to provide a particular field-of-view that sufficiently encompasses the roadway 120 on which the vehicle 102 may be traveling.

The vehicle 102 includes one or more sensors 104 to provide input data to one or more processors (not illustrated in FIG. 1) of the road-perception system 108. The sensors 104 can include a camera, a radar system, a global positioning system (GPS), a global navigation satellite system (GNSS), a lidar system, or any combination thereof. A camera can take still images or video of the roadway 120. The radar system or a lidar system can use electromagnetic signals to detect objects in the roadway 120 or features of the roadway 120. A GPS or GNSS can determine the position or heading of the vehicle 102. The vehicle 102 can include additional sensors to provide input data to the road-perception system 108 regarding the roadway 120 and the lanes 122. The road-perception system 108 can also obtain input data from external sources (e.g., nearby vehicles, nearby infrastructure, the internet) using vehicle-to-everything (V2X) or cellular communication technology.

The vehicle 102 also includes a map 106. The map 106 can include a high-definition map or database providing information about the roadway 120 and the lanes 122. The map 106 can be stored in a memory of the road-perception system 108 or memory of the vehicle 102, a map retrieved from a map or navigation service in communication with the road-perception system 108, or a map obtained from a mobile phone or other device communicatively coupled to the road-perception system 108.

The road-perception system 108 can use a fused-grid module 110 and a layer module 112 to represent the roadway 120 as a grid-based road model. The road-perception system 108 represents attributes and elements of the roadway 120 in terms of cells. In this way, the road-perception system 108 can provide a non-parametric representation of the roadway 120 without adopting assumptions about lane shapes. The road-perception system 108 uses multiple frames of discernment (FOD) to define and describe the possible states or hypotheses for a specific attribute of the roadway 120. The FODs can include at least two of the following: cell category, lane number, lane-marker type, lane-marker color, traffic signage, pavement marking, and lane type. The road-perception system 108 can define additional FODs as required by vehicle-based systems 114.

The fused-grid module 110 can use mass extraction formulas to extract mass values from input data from the sensors 104 and the map 106. The mass values indicate confidence associated with the data. The fused-grid module 110 can then fuse data from various sources (e.g., the sensors 104, the map 106) to identify layer hypotheses for each cell. A layer hypothesis identifies the probable values of each FOD for each cell. The respective mass values can determine the uncertainty associated with the layer hypotheses.

The layer module 112 can determine, using respective mass values, belief parameters, and plausibility parameters associated with each layer hypothesis. The belief parameter represents the evidence supporting a hypothesis (e.g., the sum of mass values of the subset of the hypothesis) and provides a lower bound. The belief parameter of a layer hypothesis indicates the confidence of the road-perception system 108 in a potential attribute state for that cell. The plausibility parameter represents one minus the evidence not supporting the hypothesis (e.g., one minus the sum of mass values of the sets whose intersection with the hypothesis is empty) and is an upper bound. The plausibility parameter indicates a likelihood in the potential attribute state being accurate for that cell. The value of the belief parameter and the plausibility parameter can be different for each cell of a layer hypothesis. This document describes the components and operations of the road-perception system 108, including the fused-grid module 110 and the layer module 112, in greater detail with respect to FIGS. 2 and 3.

The vehicle 102 also includes one or more vehicle-based systems 114 that can use data and the grid-based road model from the road-perception system 108 to operate the vehicle 102 on the roadway 120. The vehicle-based systems 114 can include an assisted-driving system 116 and an autonomous-driving system 118 (e.g., an Automatic Cruise Control (ACC) system, Traffic-Jam Assist (TJA) system, Lane-Centering Assist (LCA) system, and L3/L4 Autonomous Driving on Highways (L3/L4) system). Generally, the vehicle-based systems 114 can use the grid-based road model provided by the road-perception system 108 to operate the vehicle and perform particular driving functions. For example, the assisted-driving system 116 can provide automatic cruise control and monitor for the presence of an object (as detected by another system on the vehicle 102) in the first lane 122-1, in which the vehicle 102 is traveling. In this example, the road-perception data from the road-perception system 108 identifies the lanes 122. As another example, the assisted-driving system 116 can provide alerts when the vehicle 102 crosses a lane marker for the first lane 122-1.

The autonomous-driving system 118 may move the vehicle 102 to a particular location on the roadway 120 while avoiding collisions with objects detected by other systems (e.g., a radar system, a lidar system) on the vehicle 102. The road-perception data provided by the road-perception system 108 can provide information about the location of the lanes 122 and uncertainty in the location of the lanes 122 to enable the autonomous-driving system 118 to perform a lane change or steer the vehicle 102.

Figure 2:
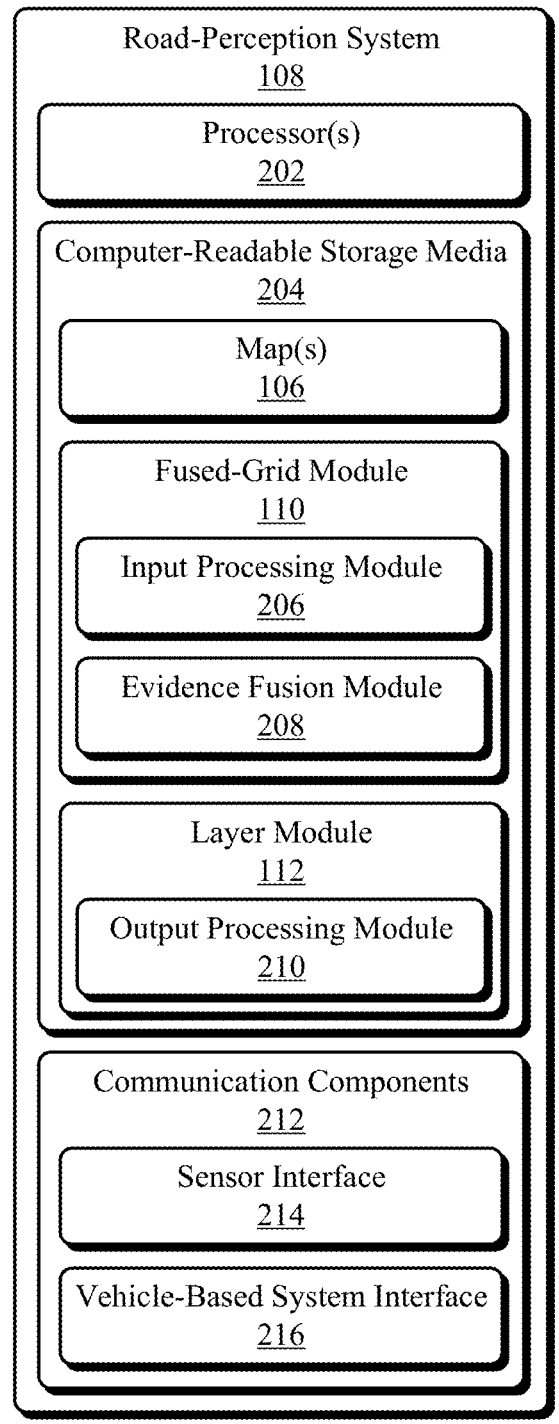
FIG. 2 illustrates an example configuration of a road-perception system that generates a grid-based road model with multiple layers.

FIG. 2 illustrates an example configuration of the road-perception system 108 that generates the grid-based road model with multiple layers. The road-perception system 108 can include one or more processors 202 and computer-readable storage media (CRM) 204.

The processor 202 can include, as non-limiting examples, a system-on-chip (SoC), an application processor (AP), a central processing unit (CPU), or a graphics processing unit (GPU). The processor 202 may be a single-core processor or a multiple-core processor implemented with a homogenous or heterogenous core structure. The processor 202 may include a hardware-based processor implemented as hardware-based logic, circuitry, processing cores, or the like. In some aspects, functionalities of the processor 202 and other components of the road-perception system 108 are provided via an integrated processing, communication, and control system (e.g., SoC), enabling various operations of the vehicle 102. The processor 202 can generate road-perception data for the vehicle-based systems 114 based on the grid-based road model of the road-perception system 108.

The CRM 204 described herein excludes propagating signals. The CRM 204 may include any suitable memory or storage device such as random-access memory (RAM), static RAM (SRAM), dynamic RAM (DRAM), non-volatile RAM (NVRAM), read-only memory (ROM), or Flash memory useable to store device data (e.g., the maps 106) of the road-perception system 108.

The processor 202 executes computer-executable instructions stored within the CRM 204. As an example, the processor 202 can execute the fused-grid module 110 to generate a grid-based road model of the roadway 120. The fused-grid module 110 can generate the grid-based road model using data from the map 106 stored in the CRM 204 or obtained from the sensors 104.

The fused-grid module 110 includes an input processing module 206 and an evidence fusion module 208. The processor 202 can execute the input processing module 206 to extract mass values associated with different input data. For example, the input processing module 206 can use mass extraction formulas to determine a respective mass value associated with data from different sources (e.g., the sensors 104, the map 106). The mass values indicate the confidence associated with the data contributing to layer hypotheses of the grid-based road model. The input processing module 206 can also validate the input data.

The processor 202 can execute the evidence fusion module 208 to update mass values associated with the input data recursively. For example, the evidence fusion module 208 can compare data from one or more previous time instants with data from a current time instant to update a mass value associated with the input data.

The layer module 112 can include an output processing module 210. The output processing module 210 can estimate belief parameters and plausibility parameters associated with the one or more layer hypotheses of each cell. The processor 202 can also execute the output processing module 210 to validate the belief parameters and the plausibility parameters.

The layer module 112 can also group, based on the Dempster-Shafer Theory, the layer hypotheses into one or more roadway hypotheses. The Dempster-Shafer Theory provides a framework for reasoning about a set of layer hypotheses subject to uncertainty. The Dempster-Shafer Theory is a generalization of Bayesian probability theory that accounts for lack of evidence or ignorance when estimating the likelihood of a layer hypothesis being true. The generation of the layer hypotheses and roadway hypotheses is described in greater detail with respect to FIGS. 3 through 6.

The road-perception system 108 can also include communication components 212, which include a sensor interface 214 and a vehicle-based system interface 216. The sensor interface 214 and the vehicle-based system interface 216 can transmit data over a communication bus of the vehicle 102, for example, when the individual components of the road-perception system 108 are integrated within the vehicle 102 they may communicate over a wired or wireless vehicle bus, for example, a controller based automotive network (CAN).

The processor 202 can also receive, via the sensor interface 214, measurement data from the one or more sensors 104 as input to the road-perception system 108. As an example, the processor 202 can receive image data or video data from a camera system via the sensor interface 214. Similarly, the processor 202 can send, via the sensor interface 214, configuration data or requests to the one or more sensors 104.

The vehicle-based system interface 216 can transmit road-perception data, including the grid-based road model, to the vehicle-based systems 114 or another component of the vehicle 102. In general, the road-perception data provided by the vehicle-based system interface 216 is in a format usable by the vehicle-based systems 114. In some implementations, the vehicle-based system interface 216 can send information to the road-perception system 108, including, as a non-limiting example, the speed or heading of the vehicle 102. The road-perception system 108 can use this information to configure itself appropriately. For example, the road-perception system 108 can adjust, via the sensor interface 214, a frame rate or scanning speed of one or more sensors 104 based on the speed of the vehicle 102 to maintain performance of the road-perception system 108 under varying driving conditions.

Operations of the fused-grid module 110, the layer module 112, and their respective subcomponents are described in greater detail with respect to FIGS. 3 through 7.

Figure 3:
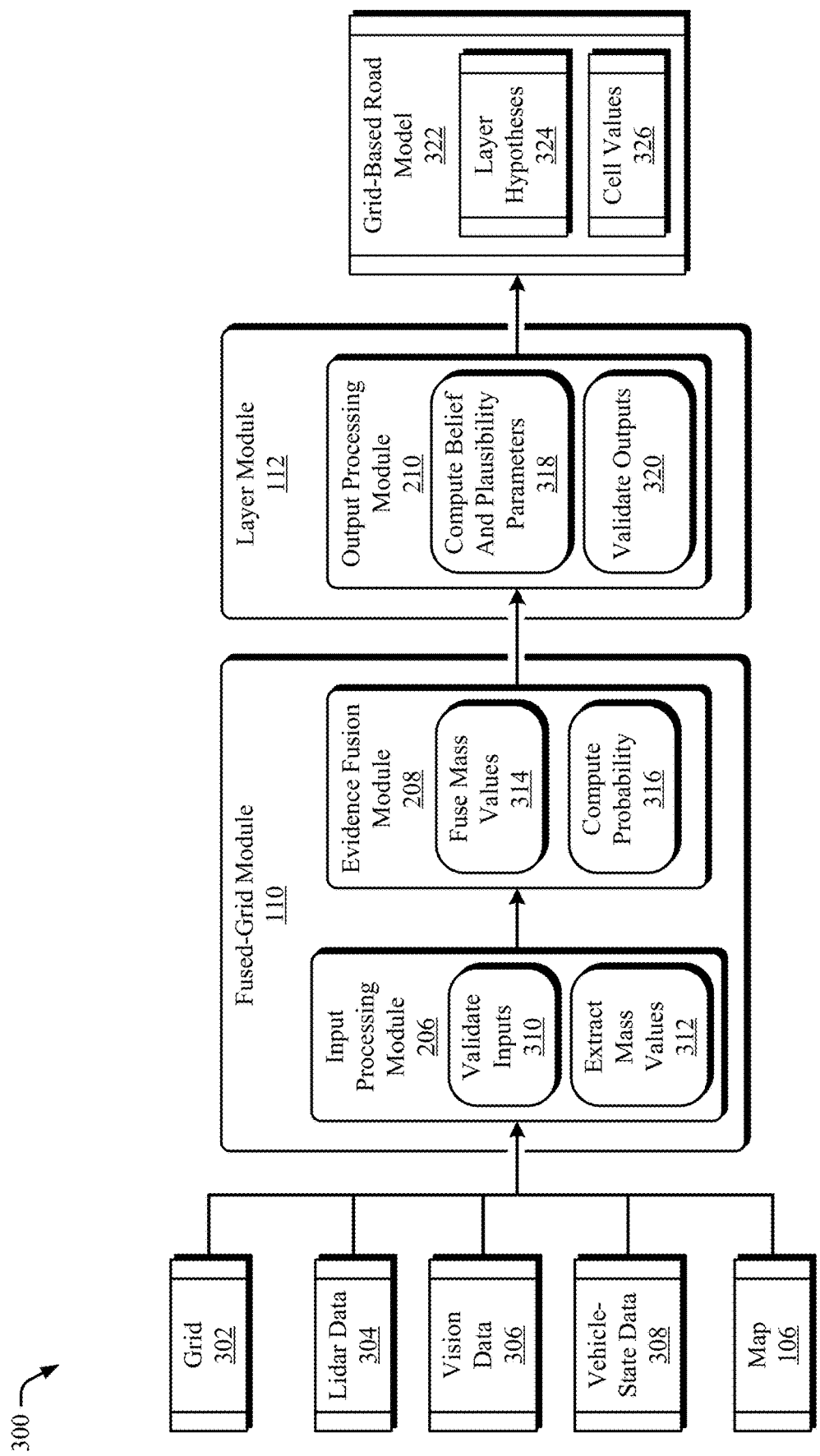
FIG. 3 illustrates an example architecture of a road-perception system to generate a grid-based road model with multiple layers.

FIG. 3 illustrates an example architecture 300 of the road-perception system 108 to generate a grid-based road model 322 with multiple layers. The architecture 300 illustrates example components and functions of the fused-grid module 110, the input processing module 206, the evidence fusion module 208, the output processing module 210, and the layer module 112 of FIG. 2. In other implementations, the road-perception system 108 include additional or fewer components and functions than those shown in FIG. 3.

The architecture 300 illustrates example information sources that are input to the fused-grid module 110. The input sources can include a grid 302, lidar data 304, vision data 306, vehicle-state data 308, and the map 106. Other inputs can include radar data, ultrasonic data, data from online sources, and data received via V2X communications. The grid 302 provides a grid representation of the roadway 120 and can be a static occupancy grid and/or a dynamic grid. The grid 302 can include the grid size, the grid resolution, and cell-center coordinates. Each cell of the grid 302 can also indicate the velocity of the vehicle 102. The lidar data 304 provides information about objects on the roadway 120 and roadway features. The vision data 306 can include still images or video of the roadway 120 and provide information about lane boundaries, objects on the roadway 120, and other roadway features. The vehicle-state data 308 can provide information about the velocity, location, and heading of the vehicle 102. The vehicle-state data 308 can be provided by, for example, a steering sensor, a yaw-rate sensor, a heading sensor, or a location sensor. The map 106 can provide information about the features of the roadway 120 and the lanes 122. The road-perception system 108 can include additional (e.g., radar data) or fewer inputs to the fused-grid module 110.

The output of the layer module 112 is the grid-based road model 322. The grid-based road model 322 includes multiple layer hypotheses 324 for each layer or frame of discernment defined by the road-perception system 108. The grid-based road model 322 also includes cell values 326 that indicate the respective belief parameters, plausibility parameters, and probabilities associated with the layer hypotheses 324.

A frame of discernment (FOD) is defined as a set of cell values within a layer of the grid-based road model 322 that describes possible states or hypotheses of a specific problem. In general, the elements in the FOD layers are mutually exclusive and exhaustive. For example, a lane-number FOD and a lane-marker-type FOD address different problems. From a computation perspective, the number of layer hypotheses 324 that need to be evaluated for each FOD increases exponentially with the number of elements therein. As a result, the described road-perception system 108 defines multiple FOD layers within the grid-based road model 322 to minimize the computational expense for any given layer.

The layer module 112 can generate multiple layer hypotheses 324 for multiple FOD layers. For example, the grid-based road model 322 can include seven FODs, including a cell-category layer, lane-number layer, lane-marker-type layer, lane-marker-color layer, traffic-sign layer, pavement-marking layer, and lane-type layer. The layer module 112 can define additional or fewer FOD layers depending on the needs of the vehicle-based systems 114, the driving environment, or any other factors.

The cell-category layer describes the possible categories of a cell within the grid-based road model 322. The cell-category layer, $\Omega_C$, can be defined in Equation (1) as:

$$\Omega_C = \{L_b, L_c, B_a, O\} \quad (1)$$

where $L_b$ indicates a lane boundary, $L_c$ indicates a lane center, $B_a$ indicates a barrier, and O indicates an "other" value.

The lane-number layer describes the possible lane-number assignment of a cell. The lane-number layer, $\Omega_{LA}$, can be defined in Equation (2) as:

$$\Omega_{LA}\{-1,0,1,2\} \quad (2)$$

where −1 represents the left-adjacent lane, 0 represents the current lane (e.g., ego lane) in which the vehicle 102 is traveling, 1 represents the right-adjacent lane, and 2 represents other lanes.

The lane-marker-type layer describes the possible lane-marker type associated with lane-boundary cells. The lane-marker-type layer, $\Omega_{MT}$, can be defined in Equation (3) as:

$$\Omega_{MT} = \{M_{solid}, M_{double}, M_{dash}, M_{WF}, M_O\} \quad (3)$$

where $M_{solid}$ indicates a solid-line lane marker, $M_{double}$ indicates a double-line lane marker, $M_{dash}$ indicates a dashed lane marker (e.g., skip lines), $M_{WF}$ indicates a fat white lane-marker, and $M_O$ indicates other type of lane marker. Additional lane-marker types can be defined for other regions and countries.

The lane-marker-color layer describes the possible lane-marker color associated with lane-boundary cells. The lane-marker-color layer, $\Omega_{MC}$, can be defined in Equation (4) as:

$$\Omega_{MC} = \{C_Y, C_W, C_O\} \quad (4)$$

where $C_Y$ indicates a yellow color for the lane marker, $C_W$ indicates a white color, and $C_O$ indicates another color. Additional lane-marker colors can be defined for other regions and countries (e.g., a blue color for South Korea).

The traffic-sign layer describes the possible type of traffic sign associated with a cell. The traffic-sign layer, $\Omega_{TS}$, can be defined in Equation (5) as:

$$\Omega_{TS} = \{TS_1, TS_2, \ldots, TS_n, NTS\} \quad (5)$$

where n is the number of possible traffic signs and NTS denotes non-traffic signs. If the roadway 120 is a highway, the possible traffic signs can include temporary traffic control signs, regulatory signs, guide signs, motorist services, and recreation signs.

The pavement-marking layer describes the possible type of pavement marking associated with a cell. The pavement-marking layer, $\Omega_{PM}$, can be defined in Equation (6) as:

$$\Omega_{PM} = \{PM_1, PM_2, \ldots, PM_m, NPM\} \quad (6)$$

where m is the number of possible pavement markings and NPM denotes non-pavement markings. The possible pavement markings can include freeway entrances, exit markings, work-zone pavement markings, and HOV lane markings.

The lane-type layer describes the possible lane type associated with a lane-number assignment. The lane-type layer, $\Omega_{LT}$, can be defined in Equation (6) as:

$$\Omega_{LT} = \{L_t, L_d, L_a, L_O\} \quad (7)$$

where $L_t$ indicates a through lane, $L_d$ indicates a deceleration lane, $L_a$ indicates an acceleration lane, and $L_O$ indicates other lane types.

Example operations of the fused-grid module 110 and the layer module 112 to generate the grid-based road model 322 from the input data are now described. At function 310, the input processing module 206 validates the input data, including the grid 302, the lidar data 304, the vision data 306, the vehicle-state data 308, and the map 106. The input processing module 206 can verify that an input use to model a boundary provides a plausible shape for the boundary. For example, on highways, a radius of curvature below 300 m is of low plausibility. The input processing module 206 can also compare various inputs to each other to verify whether the inputs are consistent or include likely outliers. For example, sensor inputs where lanes cross each other are not plausible. As another example, on a type-one, limited-access highway, a stop sign is implausible unless there is a construction zone.

At function 312, the input processing module 206 extracts mass values for each type of input data. For example, the input processing module 206 can extract the mass value, $m_{Lidar}^t$, for the current time instant, t. This document describes the extraction of mass values for lane-number assignments with respect to FIGS. 4 and 6.

The vision data 306 can directly provide information for the lane-marker type layer. The input processing module 206 can determine the mass value for each type of lane marker based on the sensor confidence in making the classification. As a result, the mass value for each cell with coordinates (x, y) is given by Equations (8) and (9):

$$m_{MT,Vision}(\alpha,(x,y)) = p_{MT}(\alpha,(x,y)) \qquad (8)$$

$$m_{MC,Vision}((\beta,(x,y)) = p_{MC}(\beta,(x,y)) \qquad (9)$$

where p indicates the classification confidence given by the sensor (e.g., a camera sensor), $\alpha \in \Omega_{MT}$, and $\beta \in \Omega_{MC}$.

The input processing module 206 can also use the vision data 306 to extract mass values associated with each possible traffic sign, pavement marking, and lane type. The vision data 306 can indicate the type of traffic sign and pavement marking. Similarly, the vision data 306 can directly or indirectly provide the lane type. The input processing module 206 can determine the mass value, m, for each possible traffic sign, pavement marking, and lane type based on the sensor confidence, p, in making the classification. As a result, the mass value for each cell can be given by Equations (10) through (12):

$$m_{TS,Vision}(\gamma,(x,y)) = p_{TS}(\gamma,(x,y)) \qquad (10)$$

$$m_{PM,Vision}(x,(x,y)) = p_{PM}(x,(x,y)) \qquad (11)$$

$$m_{LT,Vision}(\zeta,(x,y)) = p_{LT}(\zeta,(x,y)) \qquad (12)$$

where $\gamma \in \Omega_{TS}$, $x \in \Omega_{PM}$, and $\zeta \in \Omega_{LT}$.

In some implementations, the input processing module 206 can simplify the grid-based road model 322 and only extract mass values for the two largest probabilities in the vision data 306 for the traffic-sign layer and the pavement-marking layer. In these implementations, the probabilities with other cell categories are extracted to the "other" category. As a result, the input processing module 206 can extract mass values for three categories (or any other number of categories) for the traffic-sign and pavement-marking layers.

As described above, the input from the grid 302 includes grid size, grid resolution, and cell center coordinates. Each cell of the grid 302 indicates the mass value for each layer hypothesis 324 formed for the FOD layers. To distinguish from the FOD layers of the grid-based road model 322, the FOD layer for the grid 302 can be defined in Equation (13) as:

$$\Theta = \{F, SO, DO\} \qquad (13)$$

where F indicates a free space, SO indicates a cell that is statically occupied, and DO indicates a cell that is dynamically occupied. Each cell of the grid 302 also indicates the velocity V, which the input processing module 206 can use for mass value extraction.

To reduce complexity, the input processing module 206 can convert the mass values provided by the grid 302 to probability values using a pignistic transformation. The input processing module 206 then has the following probability value for each cell available: $p_F(\cdot)$, which indicates the probability of a cell to be a free space; $p_{SO}(\cdot)$, which indicates the probability of a cell to be statically occupied; and $p_{DO}(\cdot)$ which indicates the probability of a cell to be dynamically occupied.

The input processing module 206 can use the following rules to design mapping functions based on the grid 302 and the cell values therein. A cell with low velocity and high statically-occupied probability is more likely to be a barrier. A cell with high velocity and high dynamically-occupied probability is more likely to be a lane center. A cell with high free-space probability is more likely to be a lane boundary if the nearby cell (e.g., 0.5 $W_L$, where $W_L$ represents the lane width) has a high velocity and high dynamically-occupied probability.

Consider that the input processing module 206 defines $p_l(V)$ as a function of the velocity and having a relatively small value if the velocity is large. The input processing module 206 can also define $p_h(V)$ as a function of the velocity and having a relatively small value if the velocity is small. The function $p_l(V)$ can be any distribution with a peak at zero and a monotonic decay as a function of the velocity. For example, the input processing module 206 can select the function $p_l(V; \alpha, \beta)$ as a Gamma distribution with shape parameter $\alpha$ and scale parameter $\beta$. The input processing module 206 can select the function $p_h(V)$ as a Gaussian distribution with a mean value at an average roadway velocity (e.g., 65 km/h) with a default standard deviation (e.g., 8 km/h). The input processing module can tune the parameters of $p_l(V)$ and $p_h(V)$ based on specific scenarios. For different information sources, the input processing module 206 can use different parameters for the decay function depending on how much information should be retained during the mass value extraction and fusion.

Based on the mapping rules for the grid 302, the input processing module 206 can extract the mass value for a barrier cell of the cell-category layer based on Equation (14):

$$m_{C,DG}(B_a, (x,y)) = p_l(V(x,y);\alpha, \beta) \times p_{SO}(x,y) \qquad (14)$$

where x is the central coordinate of the evaluation cell, V(x, y) denotes the velocity of the evaluation cell, and $\alpha$ and $\beta$ are tuned based on the performance of the data.

The input processing module 206 can extract the mass value for a lane center and a lane boundary using Equations (15) and (16), respectively:

$$m_{C,DG}(L_c,(x,y)) = p_h(V(x,y);\alpha,\beta) \times p_{DO}(x,y) \qquad (15)$$

$$m_{C,DG}(L_b,(x,y)) = \max(p_h(V,\tilde{x}_l,\tilde{y}_l), p_h(V,\tilde{x}_r,\tilde{y}_r)) \times p_F(x,y) \times p_l(v(x,y);\alpha,\beta)) \qquad (16)$$

where max(a, b) denotes the maximum value of a and b, $\tilde{x}_l = x + \Delta \cos \theta_l$, $\tilde{y}_l = y + \Delta \sin \theta_l$, $\tilde{x}_r = x + \Delta \cos \theta_r$, $\tilde{y}_r = y + \Delta \sin \theta_r$, $\Delta$ is the total shifting distance, and $\theta_l$ and $\theta_r$ are the angle shifting to left and right, respectively.

Similar to processing of the vision data 306, the input processing module 206 assigns the mass value for other cell values based on the summation, $m_{C,DG}^{sum}((x,y))$, of the mass value for the barrier layer hypothesis, $m_{C,DG}(B_a, (x, y))$, the lane-center layer hypothesis, $m_{C,DG}(L_c, (x, y))$, and the lane-boundary layer hypothesis, $m_{C,DG}(L_b, (x, y))$. The input processing module 206 can determine the mass value for cells designated as other using Equation (17):

$$m_{C,DG}(0,(x,y)) = 1 - m_{C,DG}^{sum}((x,y)) \qquad (17)$$

In general, the map 106 is validated before processing by the input processing module 206. The confidence of the map accuracy is denoted as $p_{MAP}(\cdot)$. The map 106 can provide information that is input to each of the different FODs. The input processing module 206 can obtain the cell category $m_{C,MAP}(\cdot)$ and lane assignment $m_{LA,MAP}(\cdot)$ using similar equations. For marker type $m_{MT,MAP}(\cdot)$ marker color $m_{MC,MAP}(\cdot)$ traffic sign $m_{TS,MAP}(\cdot)$ pavement markings $m_{PM,MAP}(\cdot)$ and lane type $m_{LT,MAP}(\cdot)$ the input processing module 206 can assign the mass value based on the confidence associated with the map 106.

The input from the vision data 306 or the lidar data 304 includes polylines, or other parametric or non-parametric models, indicating lane markers and edges of the roadway 120. The vision data 306 and the lidar data 304 can also indicate semantic information for the lanes 122. The input processing module 206 can use mapping functions to map the vision data 306 or the lidar data 304 to the confidence of a cell to be a specific category within the cell-category layer. One mapping function provides that the cells that have an intersection with a lane-marker polyline (e.g., $y=\phi(x)$) are more likely to be lane boundaries, $L_b$. Another mapping function provides that the cell towards the vehicle 102 with a distance 0.5 $W_L$ from solid lane-marker cells to the cells intersected by the lane marker are more likely to be lane-center cells, $L_c$. The input processing module 206 can assign $W_L$ as the default lane width for a specific region (e.g., 3.66 meters in the United States) or based on the vision data 306. For a dashed lane marker, the input processing module 206 can assign the cells both towards and away from the vehicle 102 within a certain distance (e.g., 0.5 $W_L$) as more likely to be lane-center cells.

Based on these rules, the input processing module 206 can define the belief-mass mapping function in Equation (18) as:

$$m_{C,Vision}(L_b,(x,y))=p_c(\bar{x},\bar{y}))\times D((x,y);(\bar{x},\bar{y}),\sigma^2) \quad (18)$$

where the standard deviation represents the half-width of the lane marker (e.g., $\sigma=0.075$ m), (x, y) is the coordinate for a cell, and $p_c((\bar{x}, \bar{y}))$ is the confidence of the lane-marker point $(\bar{x}, \bar{y})$, which is generally provided by the vision data 306.

If the lane marker is a solid lane marker on the right side with distance $\Delta$ less than $W_L$, the input processing module 206 can shift the measurement point left as evidence for the lane center as provided in Equation (19):

$$m_{C,Vision}(L_c, (x,y))=p_c((\bar{x},\bar{y}))\times D((x,y);(\tilde{x}_l,\tilde{y}_l),\sigma^2) \quad (19)$$

where $x=\bar{x}+\Delta\cos\theta_l$, $y=\bar{y}+\Delta\sin\theta_l$, $\tilde{x}_l=\bar{x}+0.5\,W_L\cos\theta_l$, and $\tilde{y}_l=\bar{y}+0.5\,W_L\sin\theta_l$.

If the lane marker is a solid lane marker on the left side, then the input processing module 206 can use Equation (20):

$$m_{C,Vision}(L_c, (x,y))=p_c((\bar{x},\bar{y}))\times D((x,y);(\tilde{x}_r,\tilde{y}_r),\sigma^2) \quad (20)$$

where $x=\bar{x}+\Delta\cos\theta_r$, $y=\bar{y}+\Delta\sin\theta_r$, $\tilde{x}_r=\bar{x}+0.5\,W_L\cos\theta_r$, and $\tilde{y}_r=\bar{y}+0.5\,W_L\sin\theta_r$.

If there are two sets of lane markers available, then the input processing module 206 can use Equation (21):

$$m_{C,Vision}(L_c,(x,y))=p_c((\bar{x},\bar{y}))\times \max(D((x,y);(\tilde{x}_r,\tilde{y}_r),\sigma^2),\;D((x,y);(\tilde{x}_l,\tilde{y}_l),\sigma^2)) \quad (21)$$

The vision data 306 can also provide information for the edge and barrier categories. By using the edge and barrier polyline, the input processing module 206 can similarly obtain mass values for the barrier using Equation (22):

$$m_{C,Vision}(B_a(x,y))=p_c((\bar{x},\bar{y}))\times D((x,y);(\bar{x},\bar{y}),\sigma^2) \quad (22)$$

The input processing module 206 can denote the sum of the mass values for the lane-center category, lane-boundary category, and barrier category based on the vision data 306 as $m_{C,Vision}^{sum}((x,y))$. The mass value for a cell to be another category state is represented by Equation (23):

$$m_{C,Vision}(O,(x,y))=1-m_{C,Vision}^{sum}((x,y)) \quad (23)$$

At function 314, the evidence fusion module 208 updates and fuses mass values for each cell of each layer. The evidence fusion module 208 can use the Dempster-Shafer fusion rule to fuse various data about a cell of a layer. The data can include data from past measurements and data from current sensor measurements. For past measurements, previous mass values are propagated via a decay function that represents the decay in the information over time. If both types of information are available, the evidence fusion module 208 performs the fusion to update the mass values.

The evidence fusion module 208 can also use the Dempster-Shafer fusion rule to fuse the information of various hypotheses. The evidence fusion module 208 can first use the Dempster-Shafer method to obtain, based on the mass values for different sources, a fused mass value for a specific hypothesis. The evidence fusion module 208 can compute the mass values recursively. In this way, the evidence fusion module 208 uses the previous mass value of specific layer hypotheses and a decay function, using Equation (24):

$$m_{FT,FGRM}^{t+}(x,H)=m_{FT,FGRM}^{t-}(x,H)\oplus(m_{FT,DG}^{t}(x,H)\oplus (m_{FT,Lidar}^{t}(x,H)\oplus(m_{FT,Vision}^{t}9x,H)\oplus m_{FT,MAP}^{t}(x,H))) \quad (24)$$

where subscript FT $\in$ {C, LA, LT, TS, PM, MT, MC} denotes the fusion type and H is the layer hypothesis corresponding to a different fusion type.

The evidence fusion module 208 can use Equations (25) through (27) to perform Dempster-Shafer fusion of two information sources and obtain a joint mass value $m_{1,2}$:

$$m_{1,2}(\emptyset) = 0 \quad (25)$$

$$m_{1,2}(H) = m_1(H) \oplus m_2(H) = \frac{1}{1-K}\sum_{B\cap C=H\neq\emptyset} m_1(B)m_2(C) \quad (26)$$

where $$K=\Sigma_{B\cap C=\emptyset}m_1(B)m_2(C) \quad (27)$$

and where the value (1-K) represents the normalization coefficient, K denotes the conflict between the evidence, $m_1(\cdot)$ and $m_2(\cdot)$ represent the mass value corresponding to a specific hypothesis for the first evidence and the second evidence, respectively, and B and C are the layer hypotheses determined by the FOD. If a single information source is available, the evidence fusion module 208 need not perform evidence fusion.

At function 316, the evidence fusion module 208 uses the fused mass values to compute a probability for each cell of each layer.

At function 318, the output processing module 210 computes a belief parameter and a plausibility parameter for each cell of each layer. The belief parameter bel(H) and the plausibility parameter p/(H) are given by the Equations (28) and (29), respectively:

$$\mathrm{bel}(H)=\Sigma_{B|B\subseteq H}m(B) \quad (28)$$

$$\mathrm{pl}(H)=\Sigma_{B|B\cap H=\emptyset}m(B) \quad (29)$$

For a specific hypothesis, the probability is calculated via the pignistic transformation. At function 320, the output processing module 210 validates the belief parameters, plausibility parameters, and the probability. For example, the output processing module 210 can validate that the lane width is within applicable standards (e.g., regional policies) and is plausible. The output processing module 210 can also validate that lanes do not cross each other, are of similar width, are consistent with splitting or merging signs, and are concentric. Function 320 can be similar to the validation checks performed at function 310.

The layer module 112 can output the layer hypotheses 324 as a structured array. Each structure within the array defines a respective FOD layer. The layer module 112 can provide a component in the structure in the following manner:

```
struct fused grid-based road model_LAYER{
    struct           Grid_Info
    struct           Layer_Info
    enumeration      Layer_Type
}
```

The layer module 112 can also provide the grid information and FOD layer information as a structure array. The layer module 112 can define, using a unique cell_index for each cell of the grid 302, the Grid_Info as:

```
struct Grid_Info{
    Int[ ]       Cell_index
    float[ ]     Cell_resolution
    float[ ]     Cell_coordinate
}
```

The Layer_Info generally depends on the Layer_Type, which is an enumerated type given by Equation (30):

$$\text{Layer\_Type} \in \{\text{Standalone\_Layer, Reduced\_Layer, Shared\_Layer}\} \quad (30)$$

For the Standalone_Layer, the layer module 112 can define the Layer_Info as:

```
struct Standard_Layer_Info{
    float[ ] belief_value
    float[ ] plausibility_value
    float[ ] probability_value
}
```

For the Reduced_Layer, the layer module 112 can define the Layer_Info as:

```
struct Standard_Layer_Info{
    enumeration[ ] traffic_sign_type / pavement_marking_type
    float[ ]       belief_value
    float[ ]       plausibility_value
    float[ ]       probability_value
}
```

For the Shared_Layer, the layer module 112 can define the Layer_Info as:

```
struct Standard_Layer_Info{
    float[ ]       lane_boundary
    enumeration[ ] lane_marker_type
    enumeration[ ] lane_marker_color
}
```

For both the Standalone_Layer and Shared_Layer, the road-perception system 108 may assign cells with different resolutions. For example, the road-perception system 108 can use a higher resolution for cells with lane-marker evidence and a lower resolution for other cells.

The layer module 112 can exclusively use the cell for the Standalone_Layer to represent the belief parameter, plausibility parameter, and probability parameter for the cell to be a specific cell category. In contrast, the layer module 112 can use a structure to concatenate the belief parameter, plausibility parameter, and probability parameter for different road elements (e.g., $L_b$, $\epsilon \in \Omega_{MT}$, and $\epsilon \in \Omega_{MC}$) for the cell for a Shared_Layer. The Shared_Layer cells can be concatenated because lane markers are associated with lane-boundary cells (as opposed to the shoulder or lane center) and lane-marker information and lane-boundary information are often used together.

The layer module 112 can use a special case for $\epsilon \in \Omega_{LT}$. It can be inefficient for the layer module 112 to represent the lane type for each cell using the Standalone_Layer because the lane type is associated with the lane-number assignment, which already exists, and the number of lane types is relatively small. As a result, the layer module 112 can define a dictionary associated with the lane assignment. An example of the dictionary defined by the layer module 112 is provided in Table 1, where the Key is formed by "lane-assignment number"+"lane type" and the Value is the probability parameter value of the lane to be a specific lane type.

TABLE 1

| Key | Value | Key | Value |
| --- | --- | --- | --- |
| 1_$L_t$ | p(1, $L_t$) | −1_$L_t$ | p(−1, $L_t$) |
| 1_$L_d$ | p(1, $L_d$) | −1_$L_d$ | p(−1, $L_d$) |
| 1_$L_a$ | p(1, $L_a$) | −1_$L_a$ | p(−1, $L_a$) |
| 0_$L_t$ | p(0, $L_t$) | 2_$L_t$ | p(2, $L_t$) |
| 0_$L_d$ | p(0, $L_d$) | 2_$L_d$ | p(2, $L_d$) |
| 0_$L_a$ | p(0, $L_a$) | 2_$L_a$ | p(2, $L_a$) |

The layer representation for different outputs of the layer module 112 for the grid-based road model 322 is summarized in Table 2.

| Layer Category | Element $\epsilon$ | Data Format |
| --- | --- | --- |
| Standalone_Layer | $\epsilon \in \{L_c, B_a, O\}$ | Three Layers Each layer uses 'Standard_Layer_Info' struct |
| Reduced_Layer | $\epsilon \in \Omega_{TS}$ | Three Layers Each layer uses 'Standard_Layer_Info' struct |
| Reduced_Layer | $\epsilon \in \Omega_{PM}$ | Three Layers Each layer uses 'Standard_Layer_Info' struct |
| Standalone_Layer | $\epsilon \in \Omega_{LA}, \Omega_{LT}$ | Four Layers with a Dictionary Each layer uses 'Standard Layer Info' struct |
| Shared_Layer | $\epsilon \in L_b, \Omega_{MT}, \Omega_{MC}$ | Three Layers Each layer uses the 'Lane_boundary_lane_marker' struct |

Figure 4:
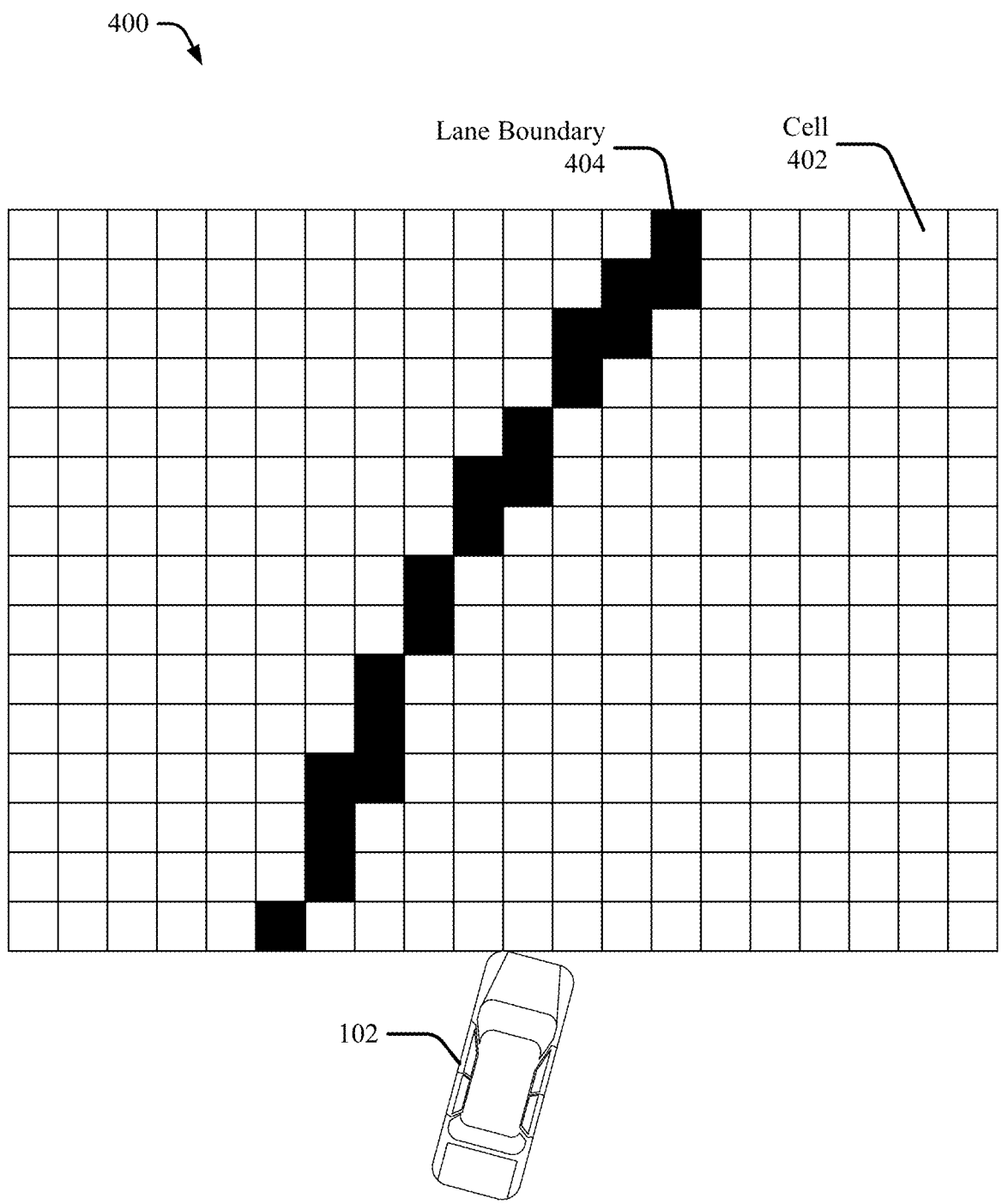
FIG. 4 illustrates an example static grid generated by a grid-based road model with multiple layers and from which a road-perception system can determine lane-boundary cells.

FIG. 4 illustrates an example static grid 400 generated by a grid-based road model with multiple layers and for which the road-perception system 108 can determine lane-boundary cells 404. The road-perception system 108 can use the static grid 400 to represent attributes of a roadway (e.g., the roadway 120) on which the vehicle 102 is traveling. The static grid 400 can include or be inclusive of the grid 302 described with respect to FIG. 3. The static grid 400 includes multiple cells 402. In FIG. 4, the cells 402 are represented as having uniform resolution. In other implementations, the cells 402 can have a higher resolution in areas of interest (e.g., lane boundaries, lane markers, lane centers).

The road-perception system 108 can extract mass values for the static grid 400. As previously discussed, the input processing module 206 can determine the mass value for a lane boundary 404 using Equation (16). The road-perception system 108 can treat each cell 402 that is determined to likely include the lane boundary 404 as a grayscale image.

The input processing module 206 can apply a Canny Edge Detector, or other edge or object detector methods, on the grayscale image to extract edges of the lane boundary 404. The Canny Edge Detector generally includes the following operations: noise reduction, gradient calculation, non-maximum suppression, double threshold analysis, and edge tracking by hysteresis. Because the Canny Edge Detection can be sensitive to image noise, the input processing module 206 can perform noise reduction. The gradient calculation involves determining the intensity change (e.g., probability to be the lane boundary 404) in different directions. The input processing module 206 can apply non-maximum suppression to provide a thin edge to the lane boundary 404, resulting in the cell with a maximum value in edge directions being kept. The input processing module 206 can use the double threshold to identify different kinds of cells 402, in particular cells with a strong contribution to the edge, cells with a weak contribution to the edge, and cells that are not relevant to the edge. Edge-detection tracking by hysteresis is used to identify real edges of the lane boundary 404 as an output.

The input processing module 206 can then perform a morphological closing operation to fill small gaps between different cells for the lane boundary 404. The morphological closing operation can include a dilation operation followed by an erosion operation.

By comparing the position ($v_0$) of the vehicle 102 with edge information for the nearest row to the vehicle 102, the input processing module 206 can define the cell corresponding to the left lane boundary of the left adjacent lane $C_{la,l}(0)$, the left lane boundary of the ego lane $C_{e,l}(0)$, the right lane boundary of the ego lane $C_{e,r}(0)$, and the right lane boundary of the right adjacent lane $C_{ra,r}(0)$. In particular, the input processing module 206 can define $C_{e,l}(0)$ as the cell 402 with a maximum value for the edge in the range $[v_0-W_L, v_0]$, where $W_L$ represents the lane width. The input processing module 206 can define $C_{e,r}(0)$ as the cell 402 with a maximum value for the edge in the range $[v_0, v_0+W_L]$. The input processing module 206 can define $C_{la,l}(0)$ as the cell 402 with a maximum mass for the edge in the range $[v_0-2W_L, v_0-W_L]$. The input processing module 206 can define $C_{ra,r}(0)$ as the cell 402 with a maximum mass for the edge in the range $[v_0+W_L, v_0+2W_L]$.

These four cells are defined as initial cells. The input processing module 206 can use these initial cells to initialize four lane-boundary cell lists: $C_{e,l}=\{C_{e,l}(0)\}$, $C_{e,r}=\{C_{e,r}(0)\}$, $C_{la,l}=\{C_{la,l}(0)\}$, and $C_{ra,r}=\{C_{ra,r}(0)\}$. By following the edge line, the input processing module 206 can iteratively expand the cell lists of the lane boundary 404 by iteratively appending row by row, as illustrated in FIG. 4. For each cell, the input processing module 206 can use the center coordinate to represent the cell.

The input processing module 206 can then use the lane-boundary cell lists as evidence to assign mass values to different cells 402. The left ego lane cell list Ce,l can be shifted to the right along a curvature direction of the lane boundary 404 with distance $\Delta=\delta, 2\delta, \ldots, n\delta$, where $\Delta \leq W_L$. For cells 402 that have a distance $\Delta$ to the cell $C_{e,l}(i)$, the mass value is calculated by the input processing module 206 using Equation (31):

$$m_{e,l}(0,(x,y))=p_{lb}(C_{e,l}(i)) \times D((x,y); (\bar{x}_{e,l}, \bar{y}_{e,l}), \sigma^2) \quad (31)$$

where $x=\bar{x}_{e,l}+\Delta\cos\theta_r$, $y=\bar{y}_{e,l}+\Delta\sin\theta_r$, $(\bar{x}_{e,l}, \bar{y}_{e,l})$ is the coordinate of the cell $C_{e,l}(i)$, and $p_{lb}$·the mass value of the cell 402 to be lane boundary 404.

The ambiguity of the ego lane to the left adjacent lane for cells with $\Delta \leq 0.5 W_L$ is given by Equation (32):

$$m_{e,l}(-1,0),(x,y))=1-m_{e,l}(0,(x,y)) \quad (32)$$

Similarly, the cell list of the left lane boundary of the ego lane $C_{e,l}$ can also be shifted to the left with distance $\Delta \leq W_L$. The input processing module 206 can extract the mass value using Equation (33):

$$m_{e,l}(1,(x,y))=p_{lb}(C_{e,l}(i)) \times D((x,y); (\bar{x}_{e,l}, \bar{y}_{e,l}), \sigma^2) \quad (33)$$

where $x=\bar{x}_{e,l}+\Delta\cos\theta_l$, $y=\bar{y}_{e,l}+\Delta\son\theta_l$, $(\bar{x}_{e,l}, \bar{y}_{e,l})$ is the coordinate of the cell $C_{e,l}(i)$, and $p_{lb}(\cdot)$ is the mass value of the cell 402 to be lane boundary 404.

The ambiguity of the ego lane to the left adjacent lane for cells with $\Delta \leq 0.5 W_L$ is given by Equation (34):

$$m_{e,l}((-1,0),(x,y))=1-m_{e,l}(-1,(x,y)) \quad (34)$$

The cell list of the right lane boundary of the ego lane $C_{e,r}$ can be shifted to the right with distance $\Delta=\delta, 2\delta, \ldots, n\delta$. For cells 402 that have a distance $\Delta$ to the cell $C_{e,r}(i)$, the mass value is calculated by the input processing module 206 using Equation (35):

$$m_{e,r}(0,y)=p_{lb}(C_{e,r}(i)) \times D((x,y); (\bar{x}_{e,r}, \bar{y}_{e,r}), \sigma^2) \quad (35)$$

where $x=\bar{x}_{e,r}+\Delta\cos\theta_l$, $y=\bar{y}_{e,r}+\Delta\sin\theta_l$, $(\bar{x}_{e,r}, \bar{y}_{e,r})$ is the coordinate of the cell $C_{e,r}(i)$, and $p_{lb}(\cdot)$ is the mass value of the cell 402 to be lane boundary 404.

The ambiguity of the ego lane to the right adjacent lane for cells with $\Delta \leq 0.5 M_L$ is given by Equation (36):

$$m_{e,r}((0,1),(x,y))=1-m_{e,r}(0,(x,y)) \quad (36)$$

The cell list of the right ego lane $C_{e,r}$ can be shifted to the right with distance $\Delta=\delta, 2\delta, \ldots, n\delta$. For cells 402 that have a distance A to the cell $C_{e,r}(i)$, the mass value is calculated by the input processing module 206 using Equation (37):

$$m_{e,r}(1,y)=p_{lb}(C_{e,r}(i)) \times D((x,y); (\bar{x}_{e,r}, \bar{y}_{e,r}), \sigma^2) \quad (37)$$

where $x=\bar{x}_{e,r}+\Delta\cos\theta_r$, $y=\bar{y}_{e,r}+\Delta\sin\theta_r$, $(\bar{x}_{e,r}, \bar{y}_{e,r})$ is the coordinate of the cell $C_{e,r}(i)$, and $p_{lb}(\cdot)$ is the mass value of the cell 402 to be lane boundary 404.

The ambiguity of the ego lane to the right adjacent lane for cells with $\Delta \leq 0.5 W_L$ is given by Equation (38):

$$m_{e,r}((0,1),(x,y))=1-m_{e,r}(1,(x,y)) \quad (38)$$

Similar to the ego lane boundary cell lists, the input processing module 206 can use the left adjacent lane boundary cell list $C_{la,l}$ as evidence to assign mass values for the lane-number assignment −1 and 2. The right adjacent lane boundary cell $C_{ra,r}$ can be used as evidence to assign the mass value for lane-number assignments 1 and 2.

The cell list of the left adjacent lane boundary $C_{la,l}$ can be shifted to the right with distance $\Delta=\delta, \delta, \ldots n\delta$. For cells 402 that have a distance $\Delta$ to the cell $C_{la,l}(i)$, the mass value is calculated by the input processing module 206 using Equation (39):

$$m_{la,l}(-1,(x,y))=p_{lb}(C_{la,l}(i)) \times D((x,y); (\bar{x}_{la,l}, \bar{y}_{la,l}), \sigma^2) \quad (39)$$

where $x=\bar{x}_{la,l}+\Delta\cos\theta_r$, $y=\bar{y}_{la,l}+\Delta\sin\theta_r$, $(\bar{x}_{la,l}, \bar{y}_{la,l})$ is the coordinate of the cell $C_{la,l}(i)$, and $p_{lb}(\cdot)$ is the mass value of the cell 402 to be lane boundary 404.

The ambiguity of the other lanes to the left adjacent lane for cells with $\Delta \leq 0.5 W_L$ is given by Equation (40):

$$m_{la,l}((-1,2),(x,y))=1-m_{la,l}(-1,(x,y)) \quad (40)$$

The cell list of the right adjacent lane boundary $C_{ra,r}$ can be shifted to the left with distance $\Delta=\delta, 2\delta, \ldots, n\delta$. For cells 402 that have a distance $\Delta$ to the cell $C_{ra,r}(i)$, the mass value is calculated by the input processing module 206 using Equation (41):

$$m_{ra,r}(1,(x,y))=p_{lb}(C_{ra,r}(i))\times D((x,y);(\bar{x}_{ra,r},\bar{y}_{ra,r}),\sigma^2) \quad (41)$$

where $x=\bar{x}_{ra,r}+\Delta\cos\theta_l$, $y=\bar{y}_{ra,r}+\Delta\sin\theta_l$, $(\bar{x}_{ra,r},\bar{y}_{ra,r})$ is the coordinate of the cell $C_{ra,r}(i)$, and $p_{lb}(\cdot)$ is the mass value of the cell 402 to be lane boundary 404.

The ambiguity of the other lanes to the right adjacent lane for cells with $\Delta \leq 0.5\,W_L$ is given by Equation (42):

$$m_{ra,r}((1,2),(x,y))=1-m_{ra,r}(1,(x,y)) \quad (42)$$

Because multiple evidence sets (lane markers) can be used to infer the lane assignment number, the input processing module 206 can use the Dempster-Shafer fusion rule to fuse the mass values for the static grid 400. The input processing module 206 can normalize the mass value for each cell 402. The input processing module 206 can use Equations 43(a) through 43(g) to determine the mass values for the cells 402:

$$m_{LA,DG}(0,(x,y))=m_{e,l}(0,(x,y))\oplus m_{e,r}(0,(x,y)) \quad (43a)$$

$$m_{LA,DG}(1,(x,y))=m_{e,r}(1,(x,y))\oplus m_{ra,r}(1,(x,y)) \quad (43b)$$

$$m_{LA,DG}(-1,(x,y))=M_{e,l}(-1,(x,y))\oplus m_{la,l}(-1,(x,y)) \quad (43c)$$

$$m_{LA,DG}((0,1),(x,y))=m_{e,r}((0,1),(x,y)) \quad (43d)$$

$$m_{LA,DG}((-1,0),(x,y))=m_{e,l}((-1,0),(x,y)) \quad (43e)$$

$$m_{LA,DG}((-1,2),(x,y))=m_{la,l}((-1,2),(x,y)) \quad (43f)$$

$$m_{LA,DG}((1,2),(x,y))=m_{ra,r}((1,2),(x,y)) \quad (43g)$$

The input processing module 206 can assign other cells as "2" with a mass value of 1. The above equations assume that $C_{e,l}$, $C_{e,r}$, $C_{la,l}$, $C_{ra,r}$ are available for the roadway 120. If there is no $C_{la,l}$ the input processing module 206 can reduce the FOD to $\{0, 1, 2\}$. Similarly, if there is no $C_{ra,r}$, the input processing module 206 can reduce the FOD to $\{-1, 0, 2\}$. If both $C_{la,l}$ and $C_{ra,r}$ are not available, the input processing module 206 can reduce the FOD to $\{0, 2\}$. The static grid 400 generally does not provide information for lane-marker type, lane-marker color, traffic signs, pavement markings, or lane type.

Figure 5A:
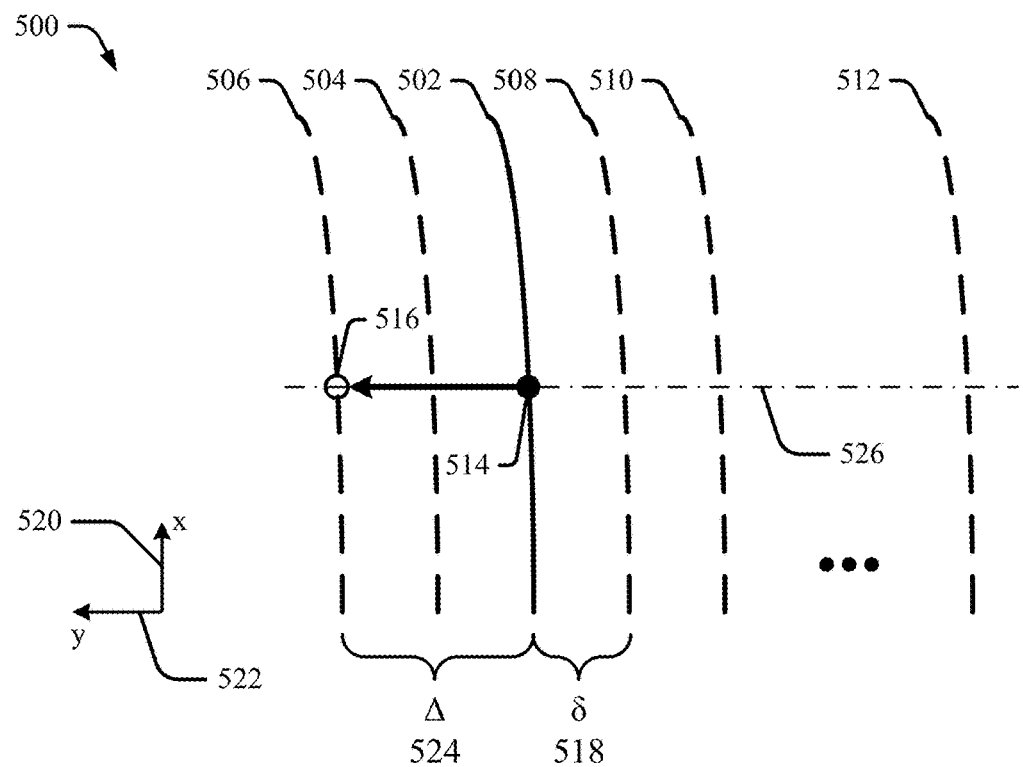
FIGS. 5A and 5B illustrate example lane sets that an input processing module of a grid-based road model with multiple layers can use to shift input evidence for determining mass values for other layer hypotheses.
Figure 5B:
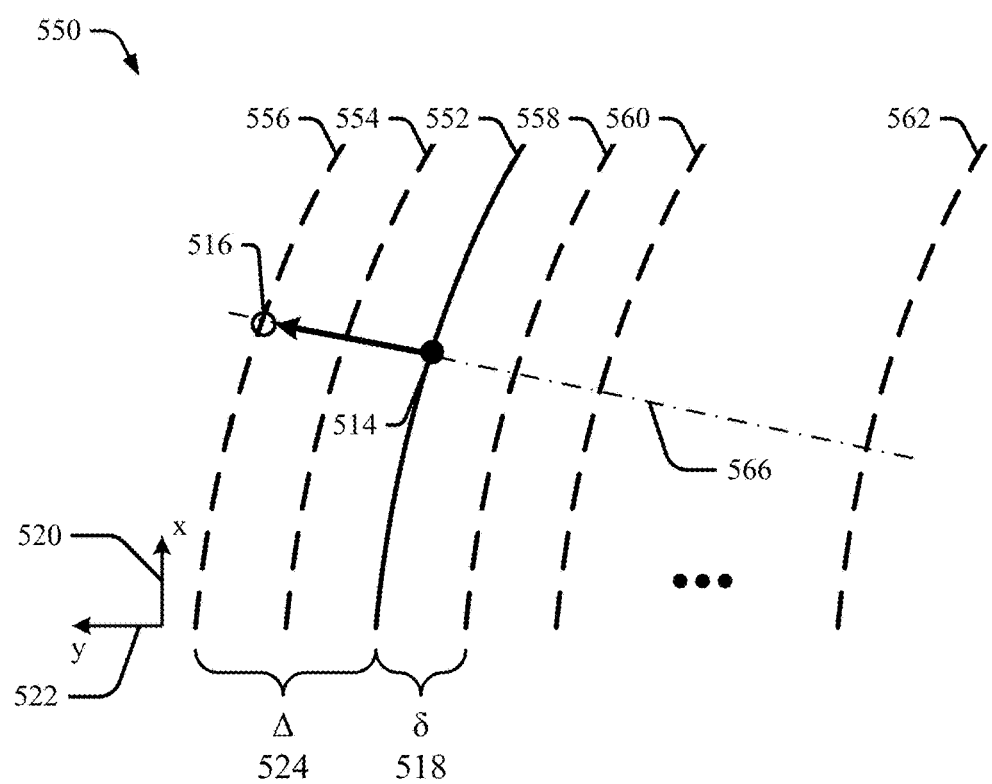

FIGS. 5A and 5B illustrate example lane sets 500 and 550, respectively, that the input processing module 206 of a grid-based road model with multiple layers can use to shift input evidence for determining mass values for other layer hypotheses. For example, the input processing module 206 can shift the lane marker around a half-width of the lane to provide evidence for the lane-center hypothesis. As a result, the input processing module 206 can routinely concentrically shift mass values left or right, depending on the curvature of the lane 122.

FIG. 5A illustrates lateral shifting that can be used by the input processing module 206. The lane set 500 includes lane markers 502, 504, 506, 508, 510, and 512, which are separated by a distance 518, $\delta$. The input processing module 206 can establish the coordinate system to be the same as a coordinate system used for the vehicle 102. For example, an x-axis 520 points forward from the vehicle 102 and a y-axis 522 points to the left.

The road-perception system 108 can determine whether the curvature of the roadway 120 or the lanes 122 is greater than a curvature threshold. If the curvature of the roadway 120 or the lane 122 is relatively small or less than the curvature threshold, the mass value from an original point 514 (e.g., a cell) can be directly shifted along the y-axis 522 to provide the mass value or evidence for a shifted point 516. The coordinate of the original point 514 is denoted as $(\bar{x}, \bar{y})$. The input processing module 206 can denote the coordinate of the shifted point 516 as $(\tilde{x}, \tilde{y})$. In addition, the step size of the shifting is denoted as $\delta$ and a total shifting 524 distance is denoted as $\Delta$ (e.g., $2\delta6$ as illustrated in FIG. 5A). A dashed-dotted line 526 denotes possible shifting directions. Based on the coordinate system, the input processing module 206 obtains the coordinate of the shifted point 516 from the original point 514 using Equation (44):

$$(\tilde{x},\tilde{y})=(\bar{x},\bar{y}\pm\Delta) \quad (44)$$

where "+" is used when the shifting direction is left and "−" is used when the shifting direction is right.

The original point 514 and the shifted point 516 have intrinsic uncertainty. To describe the uncertainty, the input processing module 206 can use the Gaussian distribution. The uncertainty of a cell with coordinates (x, y) can be calculated by the input processing module 206 using Equation (45):

$$D((x, y); (\tilde{x}, \tilde{y}), \sigma^2) = \frac{1}{\sqrt{(2\pi)}\sigma}\exp\left(-\frac{(y-\tilde{y})^2}{\sigma^2}\right) \quad (45)$$

where $\sigma$ is the standard deviation of y.

FIG. 5B illustrates the concentric shifting that can be used by the input processing module 206. The lane set 550 includes lane markers 552, 554, 556, 558, 560, and 562, which are separated by the distance 518, $\delta$.

If the curvature of the roadway 120 or the lane 122 is relatively large, the mass value from the original point 514 can be shifted along a curvature direction 566 to provide the evidence for other cells. The input processing module 206 can use three points to determine the local curvature and normal direction. In other implementations, the input processing module 206 can use other methods to identify the local curvature of the lane set 550. Based on the coordinate system, the coordinate of the shifted point 516 from the original point 514 is obtained using Equation (46)

$$(\tilde{x},\tilde{y})=(\bar{x}+\Delta\cos\theta,\bar{y}+\Delta\sin\theta) \quad (46)$$

where the angle $\theta$ is defined as the angle between the x-axis 520 and the shifting direction. When the shifting direction is right, the angle is $180 < \theta \leq 360°$.

To describe the uncertainty of the shifted point 516, the input processing module 206 can use the Gaussian distribution. The uncertainty of a cell with coordinates (x, y) can be calculated by the input processing module 206 using Equation (47)

$$D((x, y); (\tilde{x}, \tilde{y}), \sigma^2) = \frac{1}{\sqrt{(2\pi)}\sigma}\exp\left(-\frac{\Delta^2}{\sigma^2}\right) \quad (47)$$

where $\sigma^2$ is the variance of the Gaussian distribution.

When the original point 514 is shifted to provide evidence for other cells, it is possible that there may be multiple original points available. The input processing module 206 can determine the mass value of a cell based on evidence from multiple original points using the mean value of those points.

Figure 6:
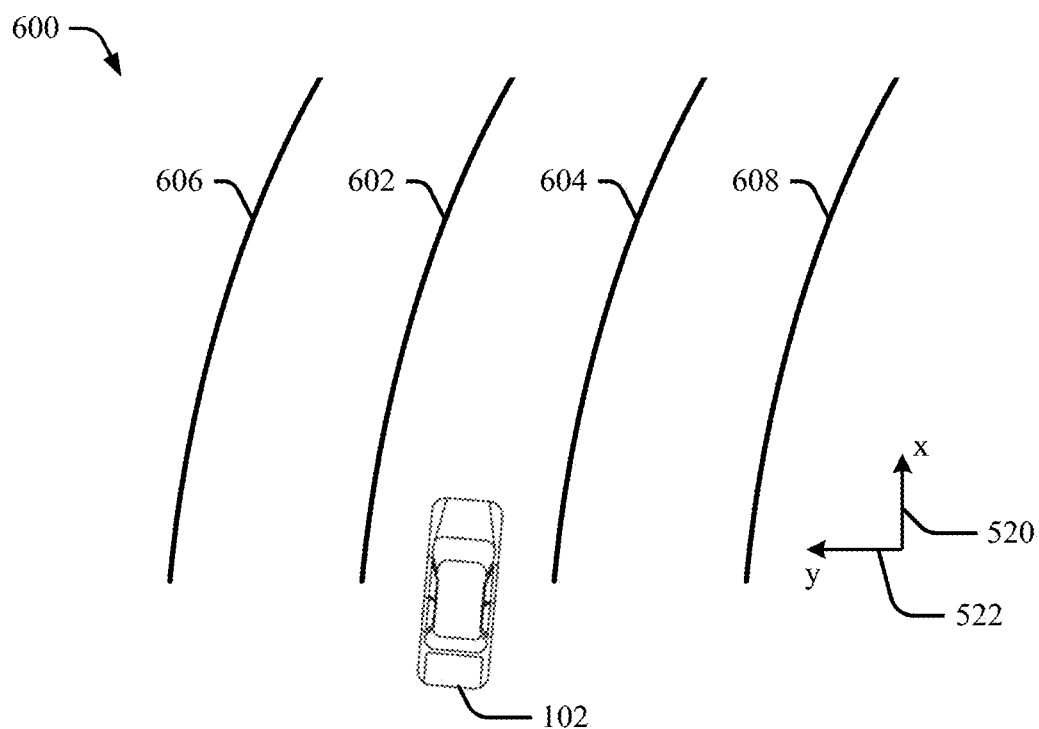
FIG. 6 illustrates an example lane set that an input processing module of a grid-based road model with multiple layers can use to determine mass values for lane-number assignments.

FIG. 6 illustrates an example lane set 600 that the input processing module 206 of a grid-based road model with multiple layers can use to determine mass values for lane-number assignments. In particular, the input processing module 206 can use lane-marker data (e.g., from the grid 302, the vision data 306, or the lidar data 304) and the vehicle-state data 308 to determine mass values of the lane-assignment layer $\Omega_{LA}$.

The input processing module 206 can compare the position of the vehicle 102 to the vision data 306, which includes lane-marker polylines, to obtain the relevant polylines. For example, the polylines can include the left ego lane marker 602 (e.g., $\phi_{e,l}$) the polyline of the right ego lane marker 604 (e.g., $\phi_{e,r}$), the polyline of the left adjacent lane marker 606 (e.g., $\phi_{la,l}$), and the polyline of the right adjacent lane marker 608 (e.g., $\phi_{ra,r}$). The input processing module 206 can assume that the polyline of the right adjacent lane marker $\phi_{la,r}$ is the same as the polyline of the left ego lane marker 602. The polyline of the right adjacent lane marker $\phi_{ra,l}$ is assumed to be the same as the polyline of the right ego lane marker 604. The input processing module 206 can also assume that the polylines are a function of $y=\phi(x)$.

The input processing module 206 can use the ego lane markers as evidence to assign mass values for different cells. The left ego lane marker point $(\overline{x}_{e,l}, \overline{y}_{e,l})$ can be used to provide evidence for cells along the curvature direction to the right. For cells with coordinate (x, y) which have a distance $(\Delta \leq W_L)$ to $(\overline{x}_{e,l}, \overline{y}_{e,l})$, the input processing module 206 can calculate the mass value using Equation (48):

$$m_{e,l}(0,(x,y))=p_c((\overline{x}_{e,l},\overline{y}_{e,l})) \times D((x,y);(\overline{x}_{e,l},\overline{y}_{e,l})\sigma^2) \tag{48}$$

where $x=\overline{x}_{e,l}+\Delta\cos\theta_r$, $y=\overline{y}_{e,l}+\Delta\sin\theta_r$ and $\delta$ is a parameter that can be tuned. For the lane-number assignment, the standard deviation $\sigma$ is set to the value of lane width $W_L$. In addition, the mapping function $D((x, y), (\overline{x}e,l,\overline{y}e,l))$ can be any function with the peak in $(\overline{x}_{e,l}, \overline{y}_{e,l})$ and decreases with the increasing of the distance to (x, y).

The ambiguity of the ego lane to the left-adjacent lane for cells with distance $\Delta \leq 0.5 \ W_L$ to $(\overline{x}_{e,l}, \overline{y}_{e,l})$ is given by Equation (49):

$$m_{e,l}((-1),(x,y))=1-m_{e,l}(0,(x,y)) \tag{49}$$

Similarly, the input processing module 206 can use the left ego lane marker point $(\overline{x}_{e,l},\overline{y}_{e,l})$ to provide evidence for cells along the curvature direction to the left. For cells with coordinate (x, y) which have a distance $(\Delta \leq W_L)$ to $(\overline{x}_{e,l}, \overline{y}_{e,l})$, the input processing module 206 can calculate the mass value using Equation (50):

$$m_{e,l}(-1,(x,y))=p_c((\overline{x}_{e,l},\overline{y}_{e,l})) \times D((x,y);(\overline{x}_{e,l},\overline{y}_{e,l})\sigma^2) \tag{50}$$

where $x=\overline{x}_{e,l}+\Delta\cos\theta_l$, $y=\overline{y}_{e,l}+\Delta\sin\theta_l$.

The ambiguity of the ego lane to the left adjacent lane for cells with distance $\Delta \leq 0.5 \ W_L$ to $(\overline{x}_{e,l}, \overline{y}_{e,l})$ is given by Equation (51):

$$m_{e,l}((-1),(x,l))=1-m_{e,l}(-1,(x,y)) \tag{51}$$

The input processing module 206 can use the right ego lane marker point $(\overline{x}_{e,r}, \overline{y}_{e,r})$ to provide evidence for cells along the curvature direction to the left. For cells with coordinate (x, y) which have a distance of $(\Delta \leq W_L)$ to $(\overline{x}_{e,r}, \overline{y}_{e,r})$, the input processing module 206 can calculate the mass value using Equation (52):

$$m_{e,r}(0,(x,y))=p_c((\overline{x}_{e,r},\overline{y}_{e,r})) \times D((x,y);(\overline{x}_{e,r},\overline{y}_{e,r}),\sigma^2) \tag{52}$$

where $x=\overline{x}_{e,r}+\Delta\cos\theta_l$, $y=\overline{y}_{e,r}+\Delta\sin\theta_l$.

The ambiguity of the ego lane to the right adjacent lane for cells with $\Delta \leq 0.5 \ W_L$ is given by Equation (53):

$$m_{e,r}((1,0),(x,y))=1-m_{e,r}(0,(x,y)) \tag{53}$$

The input processing module 206 can use the right ego lane marker point $(\overline{x}_{e,r}, \overline{y}_{e,r})$ to provide evidence for cells along the curvature direction to the right. For cells with coordinate (x, y) which have a distance of $(\Delta \leq W_L)$ to $(\overline{x}_{e,r}, \overline{y}_{e,r})$, the input processing module 206 can calculate the mass value using Equation (54):

$$m_{e,r}(1,(x,y))=p_c((\overline{x}_{e,r},\overline{y}_{e,r})) \times D((x,y);(\overline{x}_{e,r},\overline{y}_{e,r})\sigma^2) \tag{54}$$

where $x=\overline{x}_{e,r}+\Delta\cos\theta_r$, $y=\overline{y}_{e,r}+\Delta\sin\theta_r$.

The ambiguity of the ego lane to the right adjacent lane for cells with $\Delta \leq 0.5 \ W_L$ is given by Equation (55):

$$m_{e,r}((1,0)(x,y))=1-m_{e,r}(1,(x,y)) \tag{55}$$

Similar to the ego lane markers, the input processing module 206 can use the left adjacent lane marker point $(\overline{x}_{la,l}, \overline{y}_{la,l})$ as evidence to assign mass values for the lane assignment −1 and 2. The input processing module 206 can also use the right adjacent lane marker point $(\overline{x}_{ra,r}, \overline{y}_{ra,r})$ as evidence to assign mass values for lane assignments 1 and 2.

The input processing module 206 can use the left adjacent lane point $(\overline{x}_{la,l}, \overline{y}_{la,l})$ to provide evidence for cells along the curvature direction to the right. For cells with coordinate (x, y) which have a distance of $(\Delta \leq W_L)$ to $(\overline{x}_{la,l}, \overline{y}_{la,l})$, the input processing module 206 can calculate the mass value using Equation (56):

$$m_{la,l}(-1,(x,y))=p_c((\overline{x}_{la,l}, \overline{y}_{la,l})) \times D((x,y);(\overline{x}_{la,l},\overline{y}_{la,l}),\sigma^2) \tag{56}$$

where $x=\overline{x}_{la,l}+\Delta\cos\theta_r$, $y=\overline{y}_{la,l}+\Delta\sin\theta_r$.

The ambiguity of other lanes to the left adjacent lane for cells with $\Delta \leq 0.5 \ W_L$ is given by Equation (57):

$$m_{la,l}((-1,2),(x,y))=1-m_{la,l}(-1,(x,y)) \tag{57}$$

The input processing module 206 can use the right adjacent lane point $(\overline{x}_{ra,r}, \overline{y}_{ra,r})$ to provide evidence for cells along the curvature direction to the left. For cells with coordinate (x, y) which have a distance of $(\Delta \leq W_L)$ to $(\overline{x}_{ra,r}, \overline{y}_{ra,r})$ the input processing module 206 can calculate the mass value using Equation (58):

$$m_{ra,r}(1,(x,y))=p_c((\overline{x}_{ra,r},\overline{y}_{ra,r})) \times D((x,y);(\overline{x}_{ra,r},\overline{y}_{ra,r}), \sigma^2) \tag{58}$$

where $x=\overline{x}_{ra,r}+\Delta\cos\theta_l$, $y=\overline{y}_{ra,r}+\Delta\sin\theta_l$.

The ambiguity of the other lanes to the right adjacent lane for cells with $\Delta \leq 0.5$ WL is given by Equation (59):

$$m_{ra,r}((1,2),(x,y))=1-m_{ra,r}(1,(x,y)) \tag{59}$$

Because multiple evidence (lane markers) can be used to infer the lane-assignment number, the evidence fusion module 208 can use the Dempster-Shafer fusion rule to combine the mass values for the vision data 306. The evidence fusion module 208 can normalize the mass values before combining the mass values. The joint mass values can be calculated using Equations (60a) through (60g):

$$m_{LA,Vision}(0,(x,y))=m_{e,l}(0,(x,y)) \oplus m_{e,r}(0,(x,y)) \tag{60a}$$

$$m_{LA,Vision}(1,(x,y))=m_{e,r}(1,(x,y)) \oplus m_{ra,r}(1,(x,y)) \tag{60b}$$

$$m_{LA,Vision}(-1,(x,y))=m_{e,l}(-1,(x,y)) \oplus m_{a,a,l}(-1,(x,y)) \tag{60c}$$

$$m_{LA,Vision}((0,1),(x,y))=m_{e,r}((0,1),(x,y)) \tag{60d}$$

$$m_{LA,Vision}((-1,0),(x,y))=m_{e,l}((-1,0),(x,y)) \tag{60e}$$

$$m_{LA,Vision}((-1,2),(x,y))=m_{la,l}((-1,2),(x,y)) \quad (60f)$$

$$m_{LA,Vision}((1,2),(x,y))=m_{ra,r}((1,2),(x,y)) \quad (60g)$$

The input processing module can assign cells without any evidence as lane number category 2 with a mass value of 1.

EXAMPLE METHOD

Figure 7:
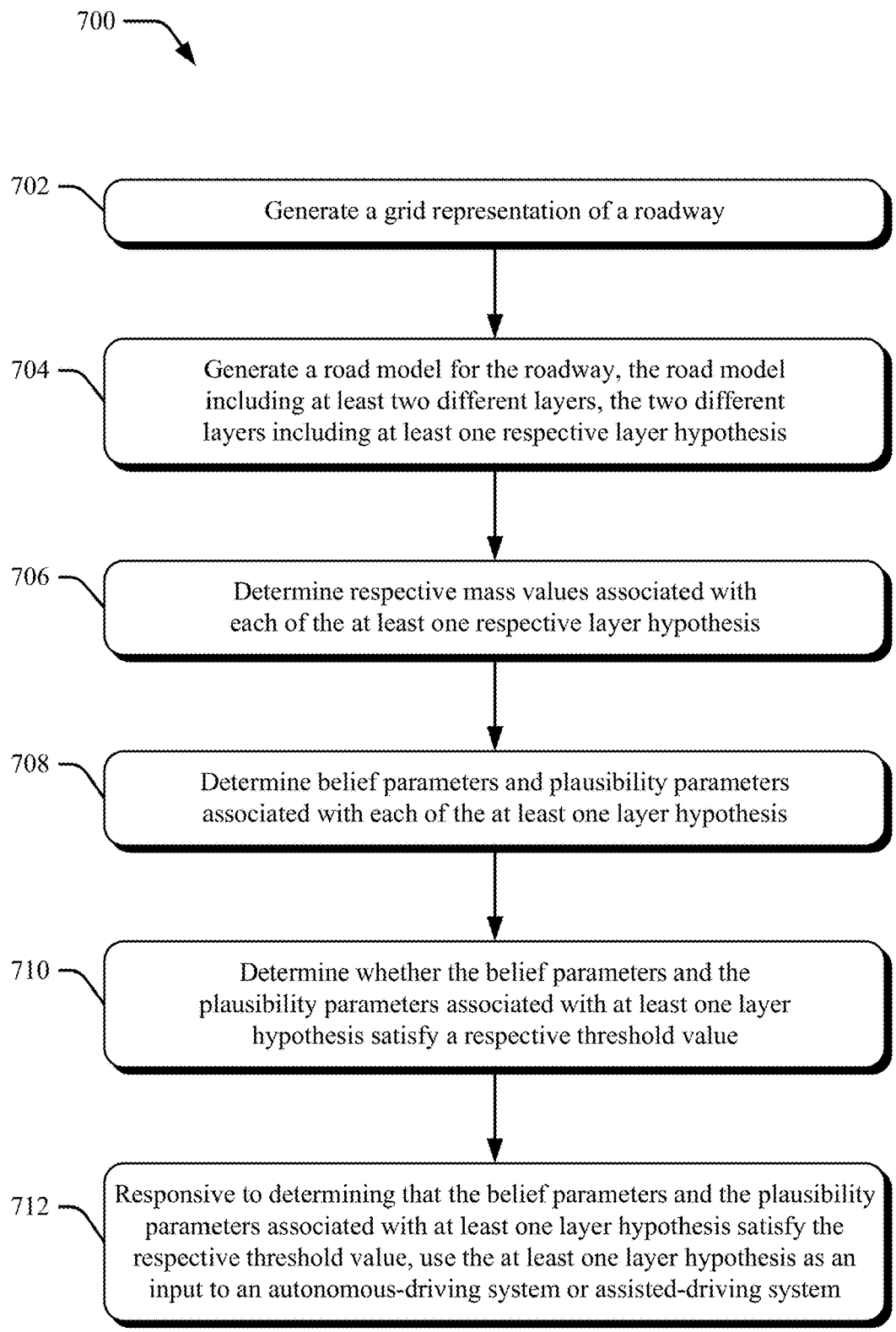
FIG. 7 illustrates a flowchart as an example process performed by a road-perception system configured to generate a grid-based road model with multiple layers.

FIG. 7 depicts an example flowchart as an example process performed by a road-perception system configured to generate a grid-based road model with multiple layers. Flowchart 700 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the road-perception system 108 of FIGS. 1 through 6 and entities detailed therein, reference to which is made for example only. The techniques are not limited to performance by one entity or multiple entities.

At 702, a grid representation of a roadway is generated by a road-perception system of a vehicle. The grid representation includes multiple cells. For example, the road-perception system 108 of the vehicle 102 generates the grid 302 or the static grid 400 of the roadway 120. The static grid 400 includes multiple cells 402.

At 704, a road model for the roadway is generated by the road-perception system. The road model is based on data from multiple information sources. The road model includes at least two different layers that represent different respective roadway attributes of the multiple cells in the grid representation of the roadway. For each cell of the multiple cells in each layer of the different layers, the at least two different layers include at least one respective layer hypothesis that indicates a potential attribute for that cell. For example, the road-perception system 108 generates, based on data from multiple information sources, the grid-based road model 322. The multiple information sources can include the grid 302, the lidar data 304, the vision data 306, the vehicle-state data 308, and the map 106. The grid-based road model 322 includes at least two different FOD layers that represent different respective attributes of the roadway 120. The FOD layers can include, for example, the cell-category layer, the lane-number assignment layer, the lane-marker type layer, lane-marker color layer, traffic-sign layer, pavement-marking layer, and the lane-type layer. For each cell 402 of the grid 302 in each layer, the FOD layers include at least one layer hypothesis 324. The layer hypotheses 324 indicate a potential attribute state for each cell of the multiple cells.

At 706, respective mass values associated with each of the at least one respective layer hypothesis are determined. The respective mass values indicate confidence associated with the data contributing to the at least one respective layer hypothesis. For example, the road-perception system 108 or the input processing module 206 can determine the mass values associated with the layer hypotheses 324 for each cell in the FOD layers.

At 708, belief parameters and plausibility parameters associated with each of the at least one layer hypothesis are determined. The belief parameter and the plausibility parameter are determined using at least one respective mass values associated with the layer hypothesis. The belief parameter indicates a confidence in the potential attribute state for that cell. The plausibility parameter indicates a likelihood in the potential attribute state being accurate for that cell. For example, the road-perception system 108 or the evidence fusion module 208 can determine, using the mass values associated with the layer hypotheses, the belief parameters and the plausibility parameters associated with each layer hypothesis 324.

At 710, it is determined whether the belief parameters and the plausibility parameters associated with at least one layer hypothesis satisfy a respective threshold value. For example, the road-perception system 108 can determine whether the belief parameters and the plausibility parameters associated with the layer hypotheses are greater or less than a respective threshold value.

At 712, responsive to determining that the belief parameters and the plausibility parameters of the at least one layer hypothesis satisfy the respective threshold value, an autonomous-driving system or an assisted-driving system can operate the vehicle on the roadway using the at least one layer hypothesis as an input. For example, responsive to determining that the belief parameters and the plausibility parameters are greater than the respective threshold value, the vehicle 102 can be operated by the autonomous-driving system 118 or the assisted-driving system 116. The autonomous-driving system 118 or the assisted-driving system 116 can operate the vehicle 102 on the roadway 120 using the at least one layer hypothesis as an input. Alternatively, the road-perception system 108, responsive to determining that at least one of the belief parameter or the plausibility parameter is less than the respective threshold value, can discontinue an operation of the vehicle 102 with the autonomous-driving system 118 or the assisted-driving system 116 and switch the operation of the vehicle 102 to control by a driver.

EXAMPLES

In the following section, examples are provided.

Example 1: A method comprising: generating, by a road-perception system of a vehicle, a grid representation of a roadway, the grid representation including multiple cells; generating, by the road-perception system and based on data from multiple information sources, a road model for the roadway, the road model including at least two different layers that represent different respective roadway attributes of the multiple cells in the grid representation of the roadway, the at least two different layers including, for each cell of the multiple cells in each layer of the different layers, at least one respective layer hypothesis that indicates a potential attribute state for that cell; determining, by the road-perception system, respective mass values associated with each of the at least one respective layer hypothesis, the respective mass values indicating confidence associated with the data contributing to the at least one respective layer hypothesis; determining, by the road-perception system and using the respective mass values, belief parameters and plausibility parameters associated with each of the at least one respective layer hypothesis, the belief parameters indicating a confidence in the potential attribute state for that cell, the plausibility parameters indicating a likelihood in the potential attribute state being accurate for that cell; determining whether the belief parameters and the plausibility parameters associated with at least one layer hypothesis satisfy a respective threshold value; and responsive to determining that the belief parameters and the plausibility parameters associated with at least one layer hypothesis satisfy the respective threshold value, using the at least one layer hypothesis as an input to an autonomous-driving system or an assisted-driving system that operates the vehicle on the roadway.

Example 2: The method of example 1, wherein the multiple information sources include at least one of a lidar system, a vision system, a camera system, a vehicle-state system, a location sensor, a steering sensor, a yaw-rate sensor, or a map.

Example 3: The method of example 1, wherein the respective mass values are recursively updated based on the data from the multiple information sources.

Example 4: The method of example 1, wherein determining the respective mass values associated with each of the at least one respective layer hypothesis comprises fusing multiple mass values that contribute to each of the at least one respective layer hypothesis using a Dempster-Shafer fusion rule.

Example 5: The method of example 1, wherein the multiple cells of the grid representation have a non-uniform resolution.

Example 6: The method of example 1, wherein the at least two different layers are defined by respective frames of discernment (FODs), the respective FODs identifying respective sets of possible layer hypotheses.

Example 7: The method of example 6, wherein the at least two different layers include at least two of a cell-category layer, a lane-number layer, a lane-marker-type layer, a lane-marker-color layer, a traffic-sign layer, a pavement-marking layer, or a lane-type layer.

Example 8: The method of example 7, wherein: the cell-category layer includes at least two of a lane boundary, a lane center, a barrier, or an other value; the lane-number layer includes at least two of a left-adjacent lane, an ego lane, a right-adjacent lane, or other lanes; the lane-marker-type layer includes at least two of a solid-line lane marker, a double-line lane marker, a dashed lane marker, a fat lane-marker, or other lane-marker type; the lane-marker-color layer includes at least two of yellow, white, or other color; and the lane-type layer includes at least two of a through lane, a deceleration lane, an acceleration lane, or other lane type.

Example 9: The method of example 7, the method further comprising: determining whether a curvature of the roadway is greater than a curvature threshold; and responsive to determining that the curvature of the roadway is greater than the curvature threshold, shifting a mass value for an original point along a y-axis normal to the vehicle to determine a mass value at a shifted point; or responsive to determining that the curvature of the roadway is less than the curvature threshold, shifting the mass value for the original point along a curvature direction to determine the mass value at the shifted point.

Example 10: The method of example 1, the method further comprising: subsequently determining whether the belief parameters and the plausibility parameters associated with at least one layer hypothesis satisfy the respective threshold value; and responsive to subsequently determining that the belief parameters or the plausibility parameters associated with the at least one layer hypothesis do not satisfy the respective threshold value, discontinuing another operation of the vehicle with the autonomous-driving system or the assisted-driving system.

Example 11: The method of example 1, the method further comprising: subsequently determining whether the belief parameters and the plausibility parameters associated with at least one layer hypothesis satisfy the respective threshold value; and responsive to subsequently determining that the belief parameters or the plausibility parameters associated with the at least one layer hypothesis do not satisfy the respective threshold value, switching another operation of the vehicle to be controlled by a driver.

Example 12: The method of example 1, wherein the autonomous-driving system or the assisted-driving system comprises at least one of an automatic cruise control system, a traffic-jam assist system, a lane-centering assist system, or an L3/L4 autonomous driving on highways system.

Example 13: A computer-readable storage media comprising computer-executable instructions that, when executed, cause a processor in a vehicle to: generate a grid representation of a roadway, the grid representation including multiple cells; generate, based on data from multiple information sources, a road model for the roadway, the road model including at least two different layers that represent different respective roadway attributes of the multiple cells in the grid representation of the roadway, the at least two different layers including, for each cell of the multiple cells in each layer of the different layers, at least one respective layer hypothesis that indicates a potential attribute state for that cell; determine respective mass values associated with each of the at least one respective layer hypothesis, the respective mass values indicating confidence associated with the data contributing to the at least one respective layer hypothesis; determine, using the respective mass values, belief parameters and plausibility parameters associated with each of the at least one respective layer hypothesis, the belief parameters indicating a confidence in the potential attribute state for that cell, the plausibility parameters indicating a likelihood in the potential attribute state being accurate for that cell; determine whether the belief parameters and the plausibility parameters associated with at least one layer hypothesis satisfy a respective threshold value; and responsive to a determination that the belief parameters and the plausibility parameters associated with at least one layer hypothesis satisfy the respective threshold value, use the at least one layer hypothesis as an input to an autonomous-driving system or an assisted-driving system that operates the vehicle on the roadway.

Example 14: The computer-readable storage media of example 13, wherein the at least two different layers include at least two of a cell-category layer, a lane-number layer, a lane-marker-type layer, a lane-marker-color layer, a traffic-sign layer, a pavement-marking layer, or a lane-type layer.

Example 15: The computer-readable storage media of example 14, wherein: the cell-category layer includes at least two of a lane boundary, a lane center, a barrier, or another value; the lane-number layer includes at least two of a left-adjacent lane, an ego lane, a right-adjacent lane, or other lanes; the lane-marker-type layer includes at least two of a solid-line lane marker, a double-line lane marker, a dashed lane marker, a fat lane-marker, or other lane-marker type; the lane-marker-color layer includes at least two of yellow, white, or other color; and the lane-type layer includes at least two of a through lane, a deceleration lane, an acceleration lane, or other lane type.

Example 16: The computer-readable storage media of example 14, the computer-readable storage media comprising additional computer-executable instructions that, when executed, cause the processor in a vehicle to: determine whether a curvature of the roadway is greater than a curvature threshold; and responsive to a determination that the curvature of the roadway is greater than the curvature threshold, shift a mass value for an original point along a y-axis normal to the vehicle to determine a mass value at a shifted point; or responsive to a determination that the curvature of the roadway is less than the curvature threshold, shift the mass value for the original point along a curvature direction to determine the mass value at the shifted point.

Example 17: The computer-readable storage media of example 13, wherein the at least two different layers are defined by respective frames of discernment (FODs), the respective FODs identifying respective sets of possible layer hypotheses.

Example 18: The computer-readable storage media of example 13, wherein the multiple information sources include at least one of a lidar system, a vision system, a camera system, a vehicle-state system, a location sensor, a steering sensor, a yaw-rate sensor, or a map.

Example 19: The computer-readable storage media of example 13, wherein the respective mass values are recursively updated based on the data from the multiple information sources.

Example 20: The computer-readable storage media of example 13, wherein a determination of the respective mass values associated with each of the at least one respective layer hypothesis comprises fusing multiple mass values that contribute to each of the at least one respective layer hypothesis using a Dempster-Shafer fusion rule.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A method comprising:
generating, by a road-perception system of a vehicle, a grid representation of a roadway, the grid representation including multiple cells;
generating, by the road-perception system and based on data from multiple information sources, a road model for the roadway, the road model including at least two different layers that represent different respective roadway attributes of the multiple cells in the grid representation of the roadway, the at least two different layers including, for each cell of the multiple cells in each layer of the different layers, at least one respective layer hypothesis that indicates a potential attribute state for that cell;
determining, by the road-perception system, respective mass values associated with each of the at least one respective layer hypothesis, the respective mass values indicating confidence associated with the data contributing to the at least one respective layer hypothesis;
determining, by the road-perception system and using the respective mass values, belief parameters and plausibility parameters associated with each of the at least one respective layer hypothesis, the belief parameters indicating a confidence in the potential attribute state for that cell, the plausibility parameters indicating a likelihood in the potential attribute state being accurate for that cell;
determining whether the belief parameters and the plausibility parameters associated with at least one layer hypothesis satisfy a respective threshold value; and
responsive to determining that the belief parameters and the plausibility parameters associated with at least one layer hypothesis satisfy the respective threshold value, using the at least one layer hypothesis as an input to an autonomous-driving system or an assisted-driving system that operates the vehicle on the roadway.

2. The method of claim 1, wherein the multiple information sources include at least one of a lidar system, a vision system, a camera system, a vehicle-state system, a location sensor, a steering sensor, a yaw-rate sensor, or a map.

3. The method of claim 1, wherein the respective mass values are recursively updated based on the data from the multiple information sources.

4. The method of claim 1, wherein determining the respective mass values associated with each of the at least one respective layer hypothesis comprises fusing multiple mass values that contribute to each of the at least one respective layer hypothesis using a Dempster-Shafer fusion rule.

5. The method of claim 1, wherein the multiple cells of the grid representation have a non-uniform resolution.

6. The method of claim 1, wherein the at least two different layers are defined by respective frames of discernment (FODs), the respective FODs identifying respective sets of possible layer hypotheses.

7. The method of claim 6, wherein the at least two different layers include at least two of a cell-category layer, a lane-number layer, a lane-marker-type layer, a lane-marker-color layer, a traffic-sign layer, a pavement-marking layer, or a lane-type layer.

8. The method of claim 7, wherein:
the cell-category layer includes at least two of a lane boundary, a lane center, a barrier, or an other value;
the lane-number layer includes at least two of a left-adjacent lane, an ego lane, a right-adjacent lane, or other lanes;
the lane-marker-type layer includes at least two of a solid-line lane marker, a double-line lane marker, a dashed lane marker, a fat lane-marker, or other lane-marker type;
the lane-marker-color layer includes at least two of yellow, white, or other color; and
the lane-type layer includes at least two of a through lane, a deceleration lane, an acceleration lane, or other lane type.

9. The method of claim 7, the method further comprising:
determining whether a curvature of the roadway is greater than a curvature threshold; and
responsive to determining that the curvature of the roadway is greater than the curvature threshold, shifting a mass value for an original point along a y-axis normal to the vehicle to determine a mass value at a shifted point; or
responsive to determining that the curvature of the roadway is less than the curvature threshold, shifting the mass value for the original point along a curvature direction to determine the mass value at the shifted point.

10. The method of claim 1, the method further comprising:
subsequently determining whether the belief parameters and the plausibility parameters associated with at least one layer hypothesis satisfy the respective threshold value; and
responsive to subsequently determining that the belief parameters or the plausibility parameters associated with the at least one layer hypothesis do not satisfy the respective threshold value, discontinuing another operation of the vehicle with the autonomous-driving system or the assisted-driving system.

11. The method of claim 1, the method further comprising:
subsequently determining whether the belief parameters and the plausibility parameters associated with at least one layer hypothesis satisfy the respective threshold value; and
responsive to subsequently determining that the belief parameters or the plausibility parameters associated with the at least one layer hypothesis do not satisfy the respective threshold value, switching another operation of the vehicle to be controlled by a driver.

12. The method of claim 1, wherein the autonomous-driving system or the assisted-driving system comprises at least one of an automatic cruise control system, a traffic-jam assist system, a lane-centering assist system, or an L3/L4 autonomous driving on highways system.

13. A computer-readable storage media comprising computer-executable instructions that, when executed, cause a processor in a vehicle to:
generate a grid representation of a roadway, the grid representation including multiple cells;
generate, based on data from multiple information sources, a road model for the roadway, the road model including at least two different layers that represent different respective roadway attributes of the multiple cells in the grid representation of the roadway, the at least two different layers including, for each cell of the multiple cells in each layer of the different layers, at least one respective layer hypothesis that indicates a potential attribute state for that cell;
determine respective mass values associated with each of the at least one respective layer hypothesis, the respective mass values indicating confidence associated with the data contributing to the at least one respective layer hypothesis;
determine, using the respective mass values, belief parameters and plausibility parameters associated with each of the at least one respective layer hypothesis, the belief parameters indicating a confidence in the potential attribute state for that cell, the plausibility parameters indicating a likelihood in the potential attribute state being accurate for that cell;
determine whether the belief parameters and the plausibility parameters associated with at least one layer hypothesis satisfy a respective threshold value; and
responsive to a determination that the belief parameters and the plausibility parameters associated with at least one layer hypothesis satisfy the respective threshold value, use the at least one layer hypothesis as an input to an autonomous-driving system or an assisted-driving system that operates the vehicle on the roadway.

14. The computer-readable storage media of claim 13, wherein the at least two different layers include at least two of a cell-category layer, a lane-number layer, a lane-marker-type layer, a lane-marker-color layer, a traffic-sign layer, a pavement-marking layer, or a lane-type layer.

15. The computer-readable storage media of claim 14, wherein:
the cell-category layer includes at least two of a lane boundary, a lane center, a barrier, or another value;
the lane-number layer includes at least two of a left-adjacent lane, an ego lane, a right-adjacent lane, or other lanes;
the lane-marker-type layer includes at least two of a solid-line lane marker, a double-line lane marker, a dashed lane marker, a fat lane-marker, or other lane-marker type;
the lane-marker-color layer includes at least two of yellow, white, or other color; and
the lane-type layer includes at least two of a through lane, a deceleration lane, an acceleration lane, or other lane type.

16. The computer-readable storage media of claim 14, the computer-readable storage media comprising additional computer-executable instructions that, when executed, cause the processor in a vehicle to:
determine whether a curvature of the roadway is greater than a curvature threshold; and
responsive to a determination that the curvature of the roadway is greater than the curvature threshold, shift a mass value for an original point along a y-axis normal to the vehicle to determine a mass value at a shifted point; or
responsive to a determination that the curvature of the roadway is less than the curvature threshold, shift the mass value for the original point along a curvature direction to determine the mass value at the shifted point.

17. The computer-readable storage media of claim 13, wherein the at least two different layers are defined by respective frames of discernment (FODs), the respective FODs identifying respective sets of possible layer hypotheses.

18. The computer-readable storage media of claim 13, wherein the multiple information sources include at least one of a lidar system, a vision system, a camera system, a vehicle-state system, a location sensor, a steering sensor, a yaw-rate sensor, or a map.

19. The computer-readable storage media of claim 13, wherein the respective mass values are recursively updated based on the data from the multiple information sources.

20. The computer-readable storage media of claim 13, wherein a determination of the respective mass values associated with each of the at least one respective layer hypothesis comprises fusing multiple mass values that contribute to each of the at least one respective layer hypothesis using a Dempster-Shafer fusion rule.

* * * * *